US008864130B2

(12) United States Patent
Umi et al.

(10) Patent No.: US 8,864,130 B2
(45) Date of Patent: Oct. 21, 2014

(54) IMAGE READING APPARATUS WITH SOUND DETECTOR AND SOUND SIGNAL GENERATOR

(71) Applicant: PFU Limited, Kahoku (JP)

(72) Inventors: Takayuki Umi, Kahoku (JP); Masanobu Hongo, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 13/959,316

(22) Filed: Aug. 5, 2013

(65) Prior Publication Data

US 2014/0054839 A1 Feb. 27, 2014

(30) Foreign Application Priority Data

Aug. 24, 2012 (JP) ................. 2012-185219

(51) Int. Cl.
*B65H 7/02* (2006.01)
*B65H 5/00* (2006.01)
*H04N 1/00* (2006.01)
*H04N 1/32* (2006.01)

(52) U.S. Cl.
CPC .. *B65H 5/00* (2013.01); *B65H 7/02* (2013.01); *H04N 1/00477* (2013.01); *H04N 1/00488* (2013.01); *H04N 1/00628* (2013.01); *H04N 1/00771* (2013.01); *H04N 1/3263* (2013.01); *H04N 1/32657* (2013.01)
USPC ................... 271/258.01; 271/10.02; 399/21; 399/393; 73/587

(58) Field of Classification Search
CPC .......... B65H 9/101; B65H 7/06; B65H 43/04; B65H 5/38; B65H 2553/30; B65H 2515/82; B65H 2511/528; B65H 2553/80; B65H 2511/12

USPC ........... 271/10.02, 110, 258.01, 240; 399/21, 399/393; 73/587

See application file for complete search history.

(56) References Cited

U.S. PATENT DOCUMENTS 3,603,680 A 9/1971 Barton
7,502,570 B2 3/2009 Nishimura et al.
(Continued)

FOREIGN PATENT DOCUMENTS

JP 57-169767 10/1982
JP 03-175460 7/1991
(Continued)

OTHER PUBLICATIONS

Office action mailed Jul. 16, 2013 in JP 2012-185219, including English translation, 5pp.

(Continued)

*Primary Examiner* — Gerald McClain
(74) *Attorney, Agent, or Firm* — Christie, Parker & Hale, LLP

(57) ABSTRACT

An image reading apparatus includes a separator, an image reader for reading an image from a paper, a conveying module for conveying a paper separated by the separator to the image reader, a side wall provided at a side of a conveyance path of the paper, a sound signal generator, provided with a sound detector between the separator and the conveying module and near the side wall, for generating a sound signal corresponding to a sound generated by the paper during conveyance, and a control module for determining whether a jam has occurred based on the sound signal.

3 Claims, 19 Drawing Sheets

(56) References Cited

U.S. PATENT DOCUMENTS

| | | |
|---|---|---|
| 7,587,299 B2 | 9/2009 | Miyasaka et al. |
| 8,567,777 B2 | 10/2013 | Syracuse et al. |
| 8,585,050 B2 | 11/2013 | Syracuse et al. |
| 2005/0189707 A1 | 9/2005 | Sano et al. |
| 2007/0018376 A1 | 1/2007 | Sano et al. |
| 2007/0177887 A1 | 8/2007 | Haas et al. |
| 2009/0003857 A1 | 1/2009 | Kuramochi et al. |
| 2009/0041485 A1 | 2/2009 | Shoji et al. |
| 2012/0019841 A1* | 1/2012 | Schaertel et al. ............ 358/448 |
| 2012/0235921 A1 | 9/2012 | Laubach |
| 2012/0235929 A1 | 9/2012 | Hongo et al. |
| 2013/0093136 A1* | 4/2013 | Sakharshete et al. .... 271/258.01 |
| 2013/0140757 A1 | 6/2013 | Phinney et al. |
| 2013/0300056 A1* | 11/2013 | Kai ............................. 271/262 |
| 2014/0054252 A1 | 2/2014 | Woodley et al. |
| 2014/0054840 A1 | 2/2014 | Umi et al. |
| 2014/0054841 A1 | 2/2014 | Morikawa et al. |
| 2014/0054849 A1 | 2/2014 | Morikawa et al. |
| 2014/0054850 A1 | 2/2014 | Umi et al. |
| 2014/0054851 A1 | 2/2014 | Morikawa et al. |
| 2014/0054852 A1 | 2/2014 | Hongo et al. |
| 2014/0062008 A1 | 3/2014 | Hongo et al. |

FOREIGN PATENT DOCUMENTS

| | | | | |
|---|---|---|---|---|
| JP | 05097283 A | * | 4/1993 | ............ B65H 7/12 |
| JP | 05097284 A | * | 4/1993 | ............ B65H 7/12 |
| JP | 8-2746 | | 1/1996 | |
| JP | 11-116098 | | 4/1999 | |
| JP | 2001-302021 | | 10/2001 | |
| JP | 2005-082350 | | 3/2005 | |
| JP | 2005-249819 | | 9/2005 | |
| JP | 2006-201316 | | 8/2006 | |
| JP | 2006290515 A | * | 10/2006 | |
| JP | 2006-322947 | | 11/2006 | |
| JP | 2007-86173 | | 4/2007 | |
| JP | 2008-207885 | | 9/2008 | |
| JP | 2009-249046 | | 10/2009 | |
| JP | 2009249046 A | * | 10/2009 | |
| JP | 2010-030772 | | 2/2010 | |
| JP | 2010-54558 | | 3/2010 | |
| JP | 2011-180481 | | 9/2011 | |
| JP | 2011-254248 | | 12/2011 | |
| JP | 2012-6738 | | 1/2012 | |
| JP | 2012006738 A | * | 1/2012 | |

OTHER PUBLICATIONS

Office action mailed Jul. 9, 2013 in JP 2012-202627, including English translation, 5pp.

Office action mailed Jul. 16, 2013 in JP 2012-195225, including English translation, 6pp.

Office action mailed Jul. 16, 2013 in JP 2012-195325, including English translation, 6pp.

Office action mailed Jul. 16, 2013 in JP 2012-195225, including English translation, 7pp.

Office action mailed Jul. 9, 2013 in JP 2012-203504, including English translation 5pp.

* cited by examiner

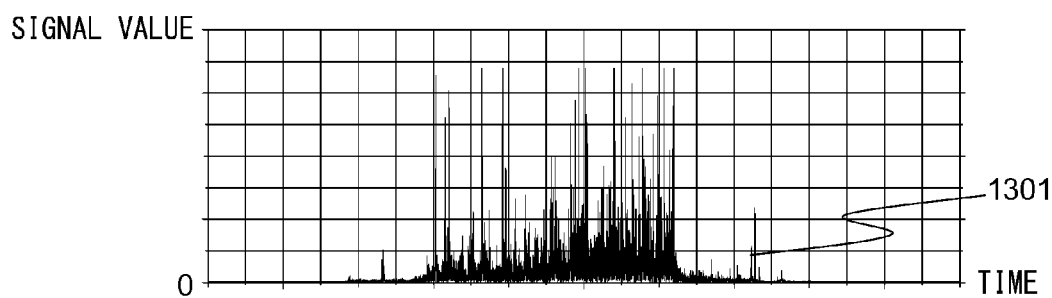
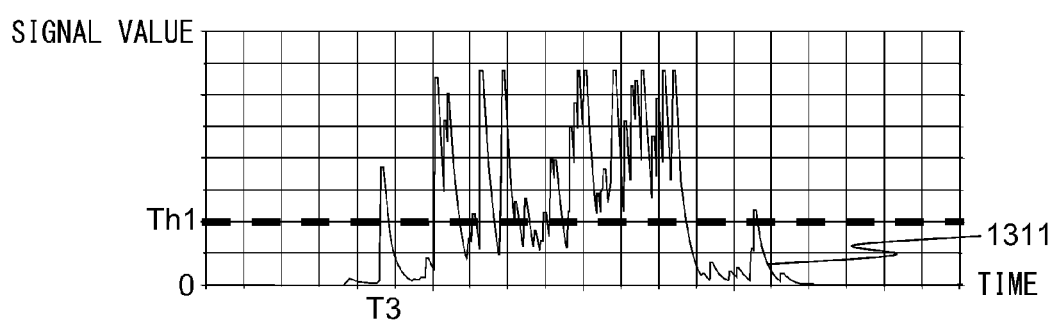
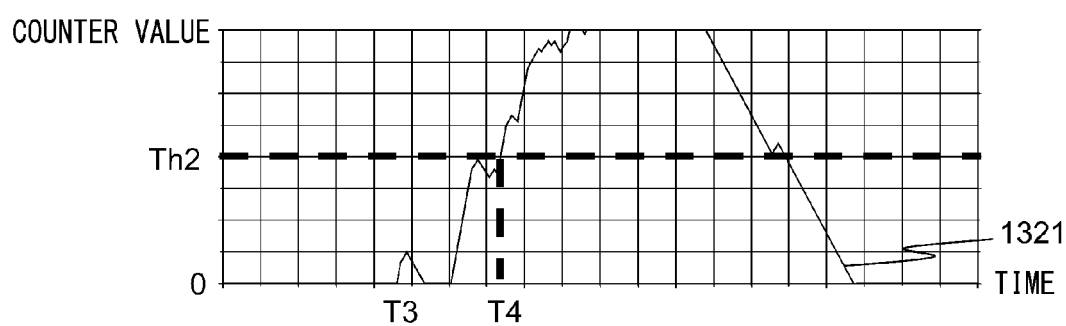

IMAGE READING APPARATUS WITH SOUND DETECTOR AND SOUND SIGNAL GENERATOR

CROSS-REFERENCE TO RELATED APPLICATIONS

This application is based upon and claims the benefit of priority of prior Japanese Patent Application No. 2012-185219, filed on Aug. 24, 2012, the entire contents of which are incorporated herein by reference.

TECHNICAL FIELD

Embodiments discussed in the present specification relate to paper conveying technology.

BACKGROUND

In an image reading apparatus, sometimes a jam occurs when the paper moves along the conveyance path. In general, an image reading apparatus is provided with the function of determining whether a jam has occurred by a paper being conveyed to a predetermined position inside the conveyance path within a predetermined time from the start of conveyance of the paper and of stopping the operation of the apparatus when a jam has occurred.

On the other hand, if a jam occurs, a large sound is generated in the conveyance path, so the image reading apparatus can determine whether a jam has occurred based on the sound which is generated on the conveyance path and thereby detect the occurrence of a jam without waiting for the elapse of the predetermined time.

A jam detection apparatus of a copier which converts the sound which is generated on the conveyance path to an electrical signal and determines that a jam has occurred when the time when the signal is over a reference level exceeds a reference value has been disclosed (see Japanese Laid-open Patent Publication No. 57-169767).

SUMMARY

However, the position where sound is generated when a jam has occurred differs depending on the type of the jam, so it is desirable to be able to detect sound at the optimal detection position according to the type of the jam.

Accordingly, it is an object of the present invention to provide an image reading apparatus which can effectively detect sound which is generated when a jam has occurred for a plurality of types of jams.

According to an aspect of the apparatus, there is provided an image reading apparatus. The image reading apparatus includes a separator, an image reader for reading an image from a paper, a conveying module for conveying a paper separated by the separator to the image reader, a side wall provided at a side of a conveyance path of the paper, a sound signal generator, provided with a sound detector between the separator and the conveying module and near the side wall, for generating a sound signal corresponding to a sound generated by the paper during conveyance of the paper, and a jam detector for determining whether a jam has occurred based on the sound signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 11 is a view for explaining a position of arrangement of a first microphone 113a.

FIG. 13A is a graph which shows an example of a first absolute value signal at the time of occurrence of a staple jam.

FIG. 13B is a graph which shows an example of a first shape signal at the time of occurrence of a staple jam.

FIG. 13C is a graph which shows an example of a first counter value at the time of occurrence of a staple jam.

DESCRIPTION OF EMBODIMENTS

Hereinafter, an image reading apparatus according to an embodiment, will be described with reference to the drawings. However, note that the technical scope of the invention is not limited to these embodiments and extends to the inventions described in the claims and their equivalents.

Figure 1:
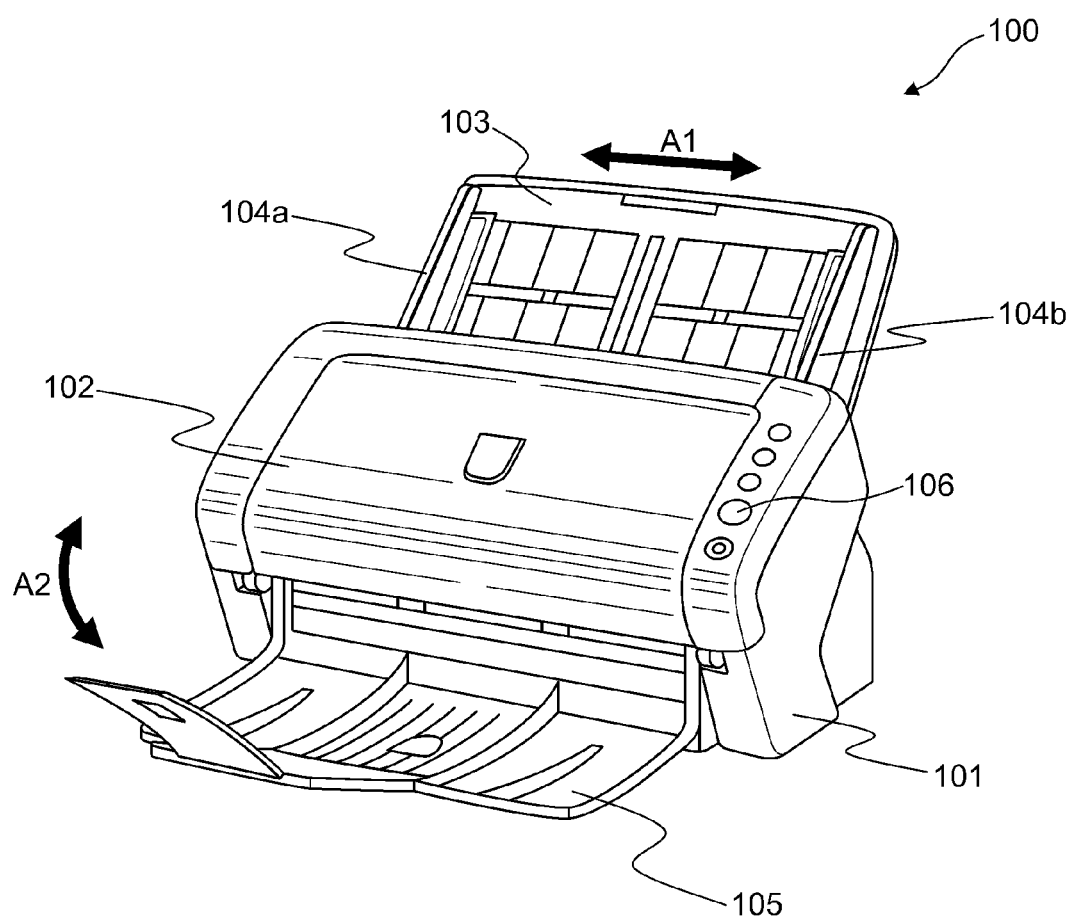
FIG. 1 is a perspective view which shows an image reading apparatus 100 according to an embodiment.

FIG. 1 is a perspective view which shows an image reading apparatus 100 which is configured as an image scanner, according to an embodiment.

The image reading apparatus 100 includes a lower housing 101, an upper housing 102, a paper tray 103, an ejection tray 105, an operation button 106, etc.

The upper housing 102 is arranged at a position which covers the top surface of the image reading apparatus 100 and is engaged with the lower housing 101 by hinges so as to be able to be opened and closed at the time of a paper jam, at the time of cleaning of the inside of the image reading apparatus 100, etc.

The paper tray 103 is engaged with the lower housing 101 in a manner enabling a paper to be placed. The paper tray 103 is provided with side guides 104a and 104b which can be moved in a direction A1 perpendicular to a conveyance direction of the paper, that is, to the left and right directions from the conveyance direction of the paper. By positioning the side guides 104a and 104b to match with the width of the paper, it is possible to limit the width direction of the paper.

The ejection tray 105 is engaged with the lower housing 101 by hinges so as to be able to pivot in the direction which is shown by an arrow mark A2. In the opened state as shown in FIG. 1, the ejected paper can be held.

The operation button 106 is arranged on the surface of the upper housing 102. If pushed, it generates and outputs an operation detection signal.

Figure 2:
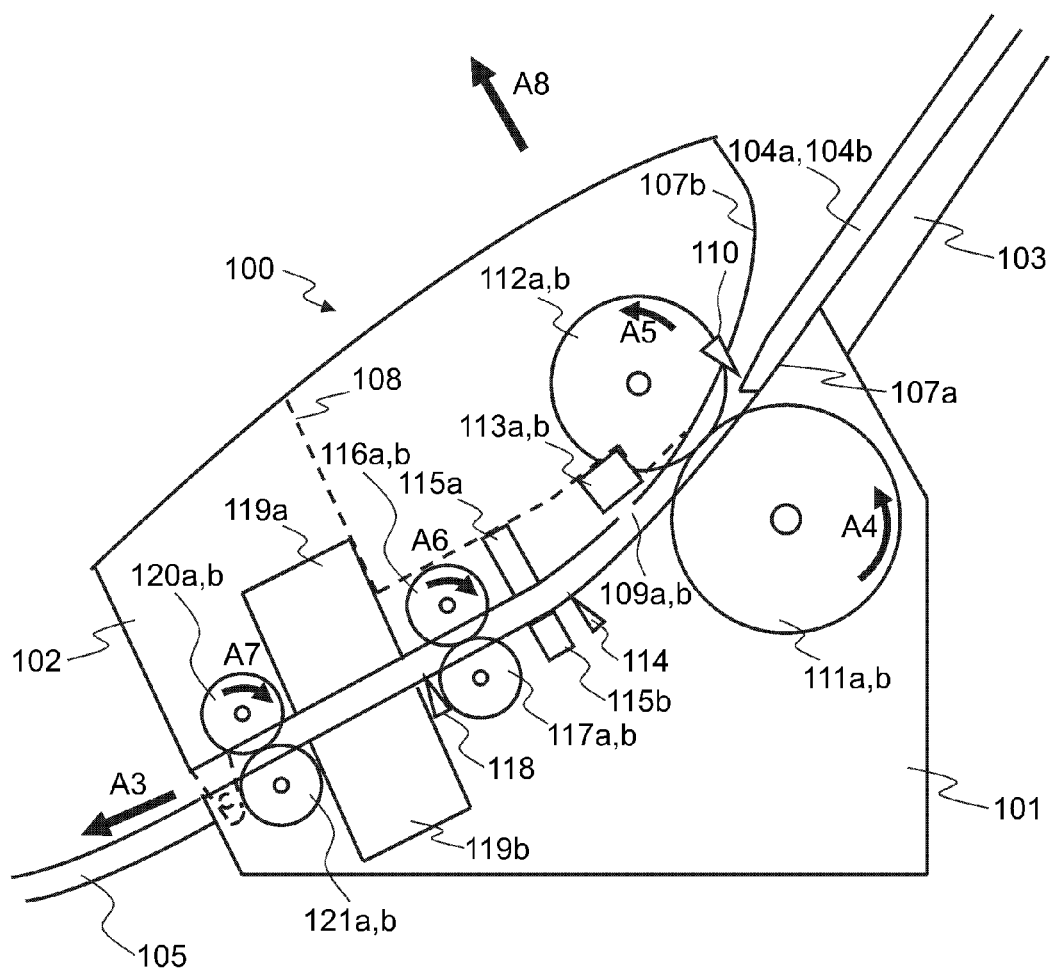
FIG. 2 is a view for explaining an example of a conveyance route at the inside of an image reading apparatus 100.

FIG. 2 is a view for explaining an example of the conveyance route at the inside of the image reading apparatus 100.

The conveyance route at the inside of the image reading apparatus 100 has a first paper detector 110, paper feed rollers 111a, 111b, retard rollers 112a, 112b, a first microphone 113a, a second microphone 113b, a second paper detector 114, an ultrasonic transmitter 115a, an ultrasonic receiver 115b, first conveyor rollers 116a, 116b, first driven rollers 117a, 117b, a third paper detector 118, a first image capture unit 119a, a second image capture unit 119b, second conveyor rollers 120a, 120b, second driven rollers 121a, 121b, etc.

Below, the paper feed rollers 111a and 111b sometimes will be referred to altogether as the "paper feed rollers 111", the retard rollers 112a and 112b sometimes will be referred to altogether as the "retard rollers 112", the first conveyor rollers 116a and 116b sometimes will be referred to altogether as the "first conveyor rollers 116", the first driven rollers 117a and 117b sometimes will be referred to overall as the "first driven rollers 117", the second conveyor rollers 120a and 120b sometimes will be referred to overall as the "second conveyor rollers 120", and the second driven rollers 121a and 121b sometimes will be referred to overall as the "second driven rollers 121".

The top surface of the lower housing 101 forms the lower guide 107a of the conveyance path of the paper, while the bottom surface of the upper housing 102 forms the upper guide 107b of the conveyance path of the paper. In FIG. 2, the arrow mark A3 shows the conveyance direction of the paper. Below, "upstream" means upstream of the conveyance direction A3 of the paper, while "downstream" means downstream of the conveyance direction A3 of the paper.

The first paper detector 110 has a contact detection sensor which is arranged at an upstream side of the paper feed roller 111 and the retard roller 112 and detects if a paper is placed on the paper tray 103. The first paper detector 110 generates and outputs a first paper detection signal which changes in signal value between a state in which a paper is placed on the paper tray 103 and a state in which one is not placed.

The first microphone 113a and the second microphone 113b are examples of sound detectors, respectively detect the sound generated by a paper during conveyance of the paper, and generate and output analog signals corresponding to the detected sound. The first microphone 113a and the second microphone 113b are arranged at the downstream sides of the paper feed rollers 111 and the retard rollers 112 while fastened to the frame 108 inside the upper housing 102. The sound generated by the paper during conveyance of the paper is made to be more accurately detected by the first microphone 113a and the second microphone 113b by holes 109a and 109b being respectively provided at positions of the upper guide 107b facing the first microphone 113a and the second microphone 113b. Below, the first microphone 113a and second microphone 113b sometimes will be referred to overall as the "microphones 113".

The second paper detector 114 has a contact detection sensor which is arranged at a downstream side of the paper feed roller 111 and the retard roller 112 and at an upstream side of the first conveyor roller 116 and first driven roller 117 and detects if there is a paper present at that position. The second paper detector 114 generates and outputs a second paper detection signal which changes in signal value between a state at which there is a paper at that position and a state where there is no paper there.

The ultrasonic transmitter 115a and the ultrasonic receiver 115b are an example of an ultrasonic detector, and are arranged near the conveyance path of the paper so as to face each other across the conveyance path. The ultrasonic transmitter 115a transmits an ultrasonic wave. On the other hand, the ultrasonic receiver 115b detects an ultrasonic wave which is transmitted by the ultrasonic transmitter 115a and passes through the paper or papers, and generates and outputs an ultrasonic signal comprised of an electrical signal corresponding to the detected ultrasonic wave. Below, the ultrasonic transmitter 115a and the ultrasonic receiver 115b will sometimes be referred to altogether as the "ultrasonic sensor 115".

The third paper detector 118 has a contact detection sensor which is arranged at a downstream side of the first conveyor roller 116 and the first driven roller 117 and an upstream side of the first image capture unit 119a and the second image capture unit 119b and detects if there is a paper at that position. The third paper detector 118 generates and outputs a third paper detection signal which changes in signal value between a state where there is a paper at that position and a state where there is no such paper there.

The first image capture unit 119a has a CIS (contact image sensor) of an equal magnification optical system type which is provided with an image capture element using CMOS's (complementary metal oxide semiconductors) which are arranged in a line in the main scan direction. This CIS reads an image from the back surface of the paper and generates and outputs an analog image signal. Similarly, the second image capture unit 119b has a CIS of an equal magnification optical system type which is provided with an image capture element using CMOS's which are arranged in a line in the main scan direction. This CIS reads an image from the front surface of the paper and generates and outputs an analog image signal. Note that, it is also possible to arrange only one of the first image capture unit 119a and the second image capture unit 119b and read only one surface of the paper. Further, instead of a CIS, it is also possible to utilize an image capturing sensor of a reduced magnification optical system type using CCD's (charge coupled devices). Below, the first image capture unit 119a and the second image capture unit 119b will sometimes be referred to overall as the "image capture units 119". The image capture units 119 are an example of an image reader for reading an image from a paper.

A paper which is placed on the paper tray 103 is conveyed between the lower guide 107a and the upper guide 107b toward the paper conveyance direction A3 by rotation of the paper feed roller 111 in the direction of the arrow mark A4 of FIG. 2. The retard roller 112 rotates in the direction of the arrow mark A5 of FIG. 2 at the time of paper conveyance. Due to the action of the paper feed roller 111 and the retard roller 112, when the paper tray 103 has a plurality of papers placed on it, among the papers which are placed on the paper tray 103, only the paper which is in contact with the paper feed roller 111 is separated. The conveyance of papers other than the separated paper is restricted (prevention of multifeed). The paper feed roller 111 and the retard roller 112 function as a paper separator.

A paper is fed between the first conveyor roller 116 and the first driven roller 117 while being guided by the lower guide 107a and the upper guide 107b. The paper is sent between the first image capture unit 119a and the second image capture unit 119b by the first conveyor roller 116 rotating in the direction of the arrow mark A6 of FIG. 2. The first conveyor rollers 116 and first driven rollers 117 function as conveying module which conveys a separated paper to the image capture units 119. The paper which is read by the image capture unit 119 is ejected onto the ejection tray 105 by the second conveyor roller 120 rotating in the direction of the arrow mark A7 of the FIG. 2.

Figure 3:
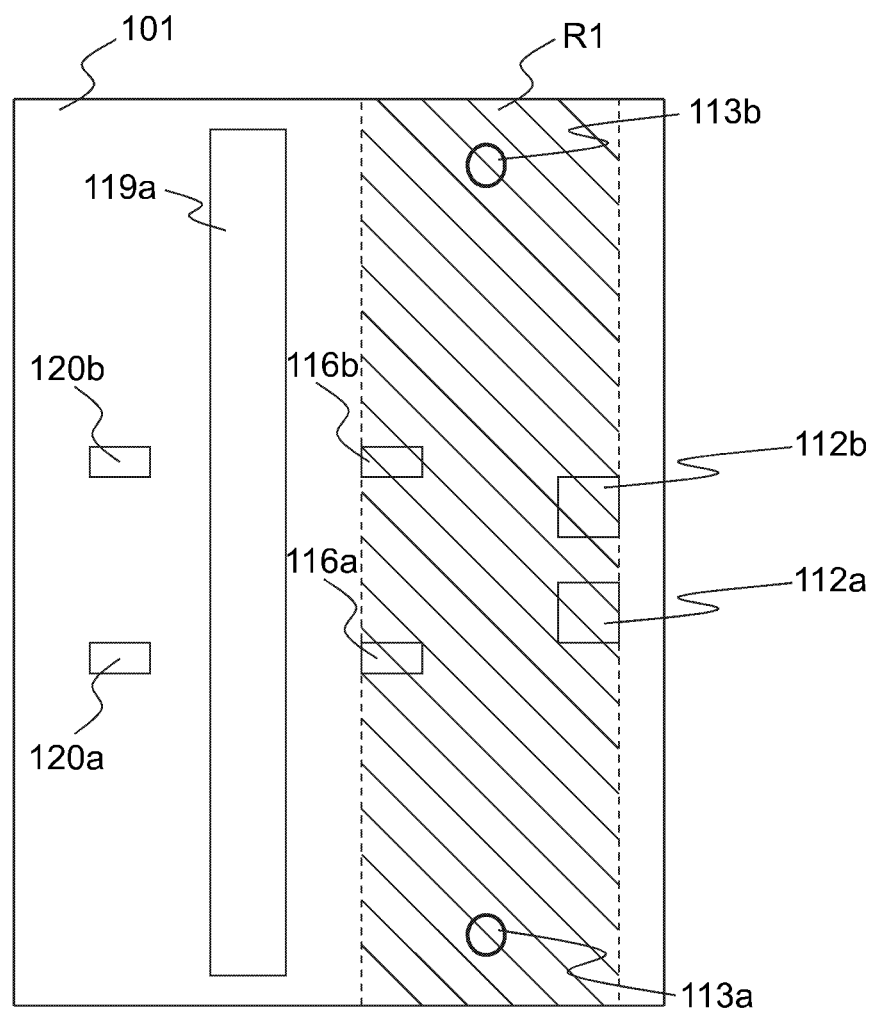
FIG. 3 is a view seen from the lower side in the state with an upper housing 102 detached.

FIG. 3 is a view seen from the lower side in the state with the upper housing 102 detached from the image reading apparatus 100, that is, a view seen in the direction of the arrow mark A8 of FIG. 2.

As shown in FIG. 3, the first microphone 113a and the second microphone 113b are provided in the region R1 between the paper feed rollers 111 and retard rollers 112, and the first conveyor rollers 116 and the first driven rollers 117 in the paper conveyance direction. Note that, the region R1 is a region including the paper feed rollers 111, retard rollers 112, first conveyor rollers 116, and first driven rollers 117 themselves.

Figure 4:
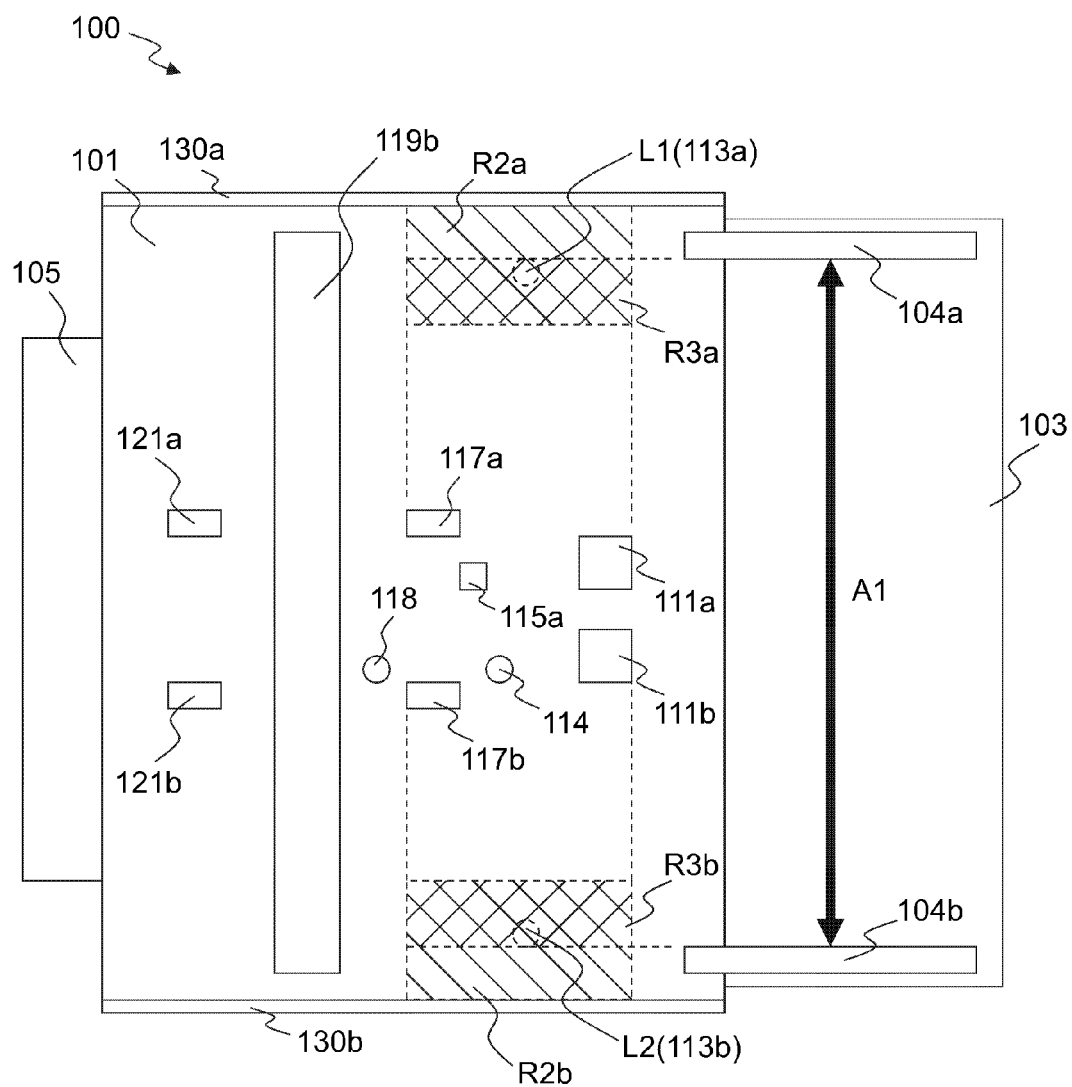
FIG. 4 is a view of an image reading apparatus 100 seen from an upper side with an upper housing 102 detached.

FIG. 4 is a view seen from the upper side in the state detaching the image reading apparatus 100 from the upper housing 102, that is, a view seen in a direction opposite to the arrow mark A8 of FIG. 2.

The lower housing 101 is provided with side walls 130a, 130b at a side of a conveyance path of the paper at two ends in a direction which perpendicularly intersects the paper conveyance direction.

The position L1 shows the position on the lower housing 101 which the first microphone 113a faces in the state where the upper housing 102 is closed, while the position L2 shows the position on the lower housing 101 which the second microphone 113b faces in the state where the upper housing 102 is closed.

The first microphone 113a is provided inside a region R2a near the side wall 130a, in a direction which perpendicularly intersects the paper conveyance direction, while the second microphone 113b is provided inside a region R2b near the side wall 130b, in a direction which perpendicularly intersects the paper conveyance direction. The distance between the first microphone 113a and the side wall 130a and the distance between the second microphone 113b and the side wall 130b are preferably within 50 mm.

Furthermore, the first microphone 113a is provided within the range where the paper is placed on the paper tray 103, in a direction which perpendicularly intersects the paper conveyance direction, that is, inside the region R3a at the center side of the conveyance path from the position where the side guide 104a is arranged when conveying a paper of the maximum width guaranteed by the image reading apparatus 100. Similarly, the second microphone 113b is provided inside the region R3b at the center side from the position where the side guide 104b is arranged when conveying a paper of the maximum width, in a direction which perpendicularly intersects the paper conveyance direction.

Below, the reason for arranging the first microphone 113a and second microphone 113a in the above way will be explained.

Figure 5:
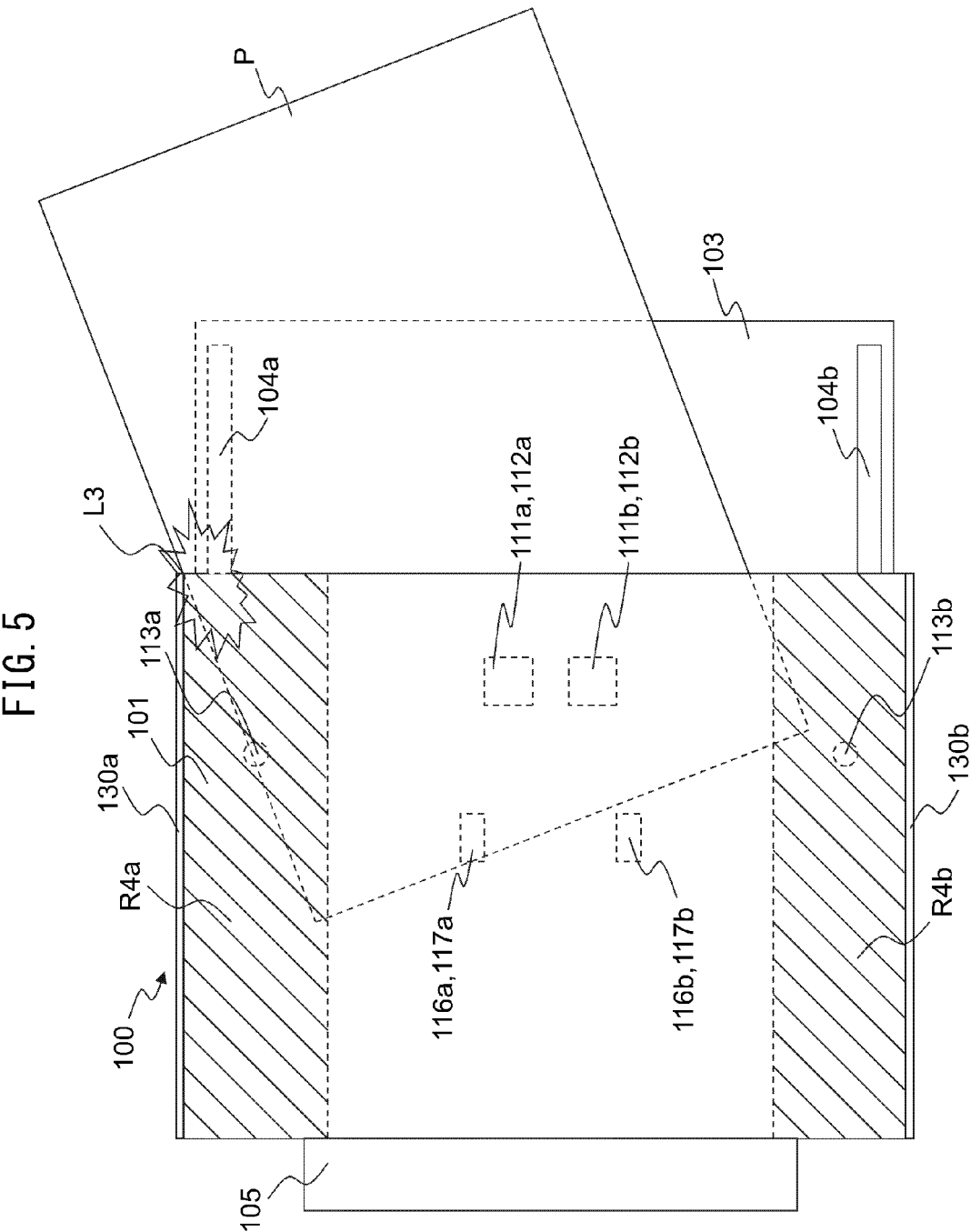
FIG. 5 is a view for explaining a skew jam.

FIG. 5 is a view for explaining a jam which occurs at the image reading apparatus 100.

As shown in FIG. 5, if a paper P is conveyed at a slant with respect to the paper conveyance direction, the rear end of the paper P ends up riding over the side guide 104a on the paper tray 103. If the paper P is conveyed further, the end part of the paper P strikes the side wall 130a near the position where the lower housing 101 and the paper tray 103 engage whereby the paper P becomes twisted centering around the struck part L3. After that, the paper P is conveyed by the paper feed rollers 111, first conveyor rollers 116, and second conveyor rollers 120 toward the downstream side. The twisting becomes greater along with conveyance and a large sound is generated due to the twisting. The occurrence of a jam as a result of the paper being conveyed slanted in this way is called a "skew jam".

Note that, the inventors ran an experiment in which they used PPC (plain paper copier) paper to cause a skew jam and cause twisting in a paper. As a result, it was confirmed that twisting occurred in a range of 50 mm at the maximum from the part L3 which strikes the side wall 130a toward the center direction of the paper.

On the other hand, when a paper has a wrinkle, even if no jam occurs, when the paper passes between the paper feed rollers 111 and the retard rollers 112, that wrinkle causes a loud sound to be generated.

Therefore, to effectively detect the sound which is generated due to a skew jam, it is preferred that the first microphone 113a is arranged at a position as close as possible to the side wall 130a and the second microphone 113b is arranged at a position as close as possible to the side wall 130b, in a direction which perpendicularly intersects the conveyance direction of the paper. Further, to prevent the sound which is generated due to a wrinkle from being detected as much as possible, it is preferred that the first microphone 113a and second microphone 113b are arranged at positions as far as possible from the paper feed rollers 111 and retard rollers 112 which are arranged near the center of the paper in the direction which perpendicularly intersects the conveyance direction of the paper. That is, to effectively detect the sound which is generated due to a skew jam, it is preferred that the first microphone 113a is arranged near the side wall 130a such as inside the region R4a of FIG. 5 and the second microphone 113b is arranged near the side wall 130b such as inside the region R4b. In particular, it is preferred that, based on the above experimental results, the first microphone 113a is arranged within 50 mm from the side wall 130a and the second microphone 113b is arranged within 50 mm from the side wall 130b.

Figure 6:
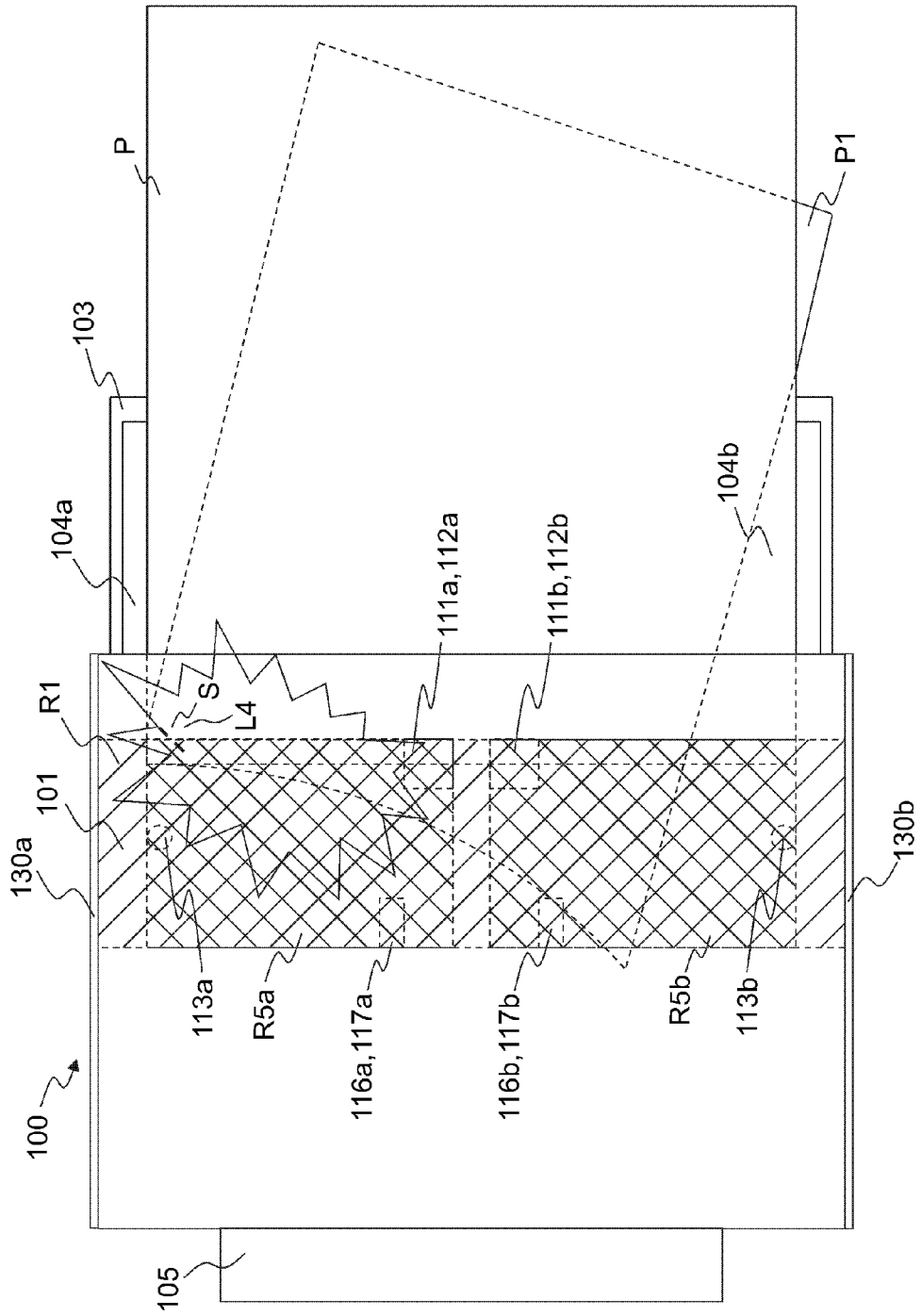
FIG. 6 is a view for explaining a staple jam.

FIG. 6 is a view for explaining another jam which occurs in the image reading apparatus 100.

FIG. 6 shows an example of a case which a paper P which is fastened by a staple S is conveyed with its fastened part toward the downstream side. In general, a paper which is fastened by a staple is usually a paper of a certain extent of size or more such as the A4 size or B5 size and is fastened by a staple at one of the four corners of the paper. If a paper which is fastened by a staple S ends up being conveyed by the image reading apparatus 100 with the fastened part toward the downstream side, the paper feed rollers 111 and retard rollers 112 will attempt to convey only the sheet P1 which contacts the paper feed rollers 111 in the paper P. This sheet P1 is attempted to be conveyed by the first conveyor rollers 116 and first driven rollers 117 toward the downstream side further. On the other hand, the sheets other than the sheet P1 are fastened by the staple S, so are not conveyed.

Therefore, the sheet P1 pivots about the staple S, twisting occurs, and a loud sound is generated by the twisting. This twisting is generated in the range from the part L4 which is fastened by the staple S to the paper feed roller 111a and retard roller 112a which separate the paper P, in the direction which perpendicularly intersects the paper conveyance direction. Further, this twisting occurs in the range from the part L4 which is fastened by the staple S to the first conveyor roller 116a and first driven roller 117a which convey the paper P1 to the downstream side, in the paper conveyance direction. The occurrence of a jam as a result of conveyance of a paper which is fastened by a staple in this way is called a "staple jam".

Therefore, to effectively detect sound which is generated due to a staple jam, it is preferable that microphones are arranged at regions where the part L4 which is fastened by a staple S stops without being conveyed, such as the inside of the region R1 of FIG. 6, between the position of the paper feed rollers 111 and retard rollers 112 and the position of the first conveyor rollers 116 and first driven rollers 117, in the conveyance direction of the paper. Note that, by arranging microphones between the paper feed rollers 111 and retard rollers 112, and the first conveyor rollers 116 and first driven rollers 117, it becomes possible to suppress the detection of sound which is generated outside of the housing.

Further, the positions of the two ends of the paper which is conveyed differ depending on the size of the paper, but as explained above, a paper which is fastened by a staple is usually a paper of a certain extent of size or more such as the A4 size or B5 size and the larger the size of the paper, the higher the possibility of it being fastened by a staple. Therefore, it is preferable that the first microphone 113a and second microphone 113b are arranged so as to enable detection of a staple jam when a paper of the maximum width which the image reading apparatus 100 guarantees is conveyed while fastened by a staple. The positions of the end parts of a maximum width paper in the direction which perpendicularly intersects the conveyance direction of the paper are the positions at which the side guide 104a is arranged when conveying a maximum width paper. That is, it is preferable that the first microphone 113a and second microphone 113b are arranged in regions, such as in the region R5a and the region R5b of FIG. 6, in the range from the position where the side guide 104a is arranged when conveying a maximum width paper to the position of the paper feed rollers 111 and retard rollers 112, in the direction which perpendicularly intersects the conveyance direction of the paper. Note that, the region R5a is a region which includes the paper feed roller 111a and retard roller 112a themselves, while the region R5b is a region which includes the paper feed roller 111b and retard roller 112b themselves.

Therefore, to effectively detect both sound which is generated due to a skew jam and sound which is generated due to a staple jam, it is preferable that the first microphone 113a is arranged in the region R2a of FIG. 4 where the region R4a of FIG. 5 and the region R1 of FIG. 6 overlap and the second microphone 113b is arranged in the region R2b where the region R4b and the region R1 overlap. Furthermore, more preferably the first microphone 113a is arranged in the region R3a of FIG. 4 where the region R4a of FIG. 5 and the region R5a of FIG. 6 overlap, while the second microphone 113b is arranged at the region R3b where the region R4b and the region R5b overlap.

In the image reading apparatus 100, the first microphone 113a is arranged in the region R3a and the second microphone 113b is arranged in the region R3b, so it is possible to effectively detect the sounds which are generated by a skew jam and a staple jam while suppressing the detection of sound which is generated due to a wrinkle and sound which is generated at the outside of the housing (below, called "noise").

In the configuration of the image reading apparatus 100, the microphone 113 detects some noise, but the ratio of the noise to the sound which is generated by each jam becomes smaller. The above-mentioned "suppressing the detection of noise" means reducing this ratio. The image reading apparatus 100 "suppresses detection of noise", so it is possible to eliminate the effect of noise by setting a threshold value between the magnitude of the sound which is generated by a jam and the magnitude of noise for the signals which are output by the microphones 113 and cutting the components which are at the threshold value or below.

Figure 7:
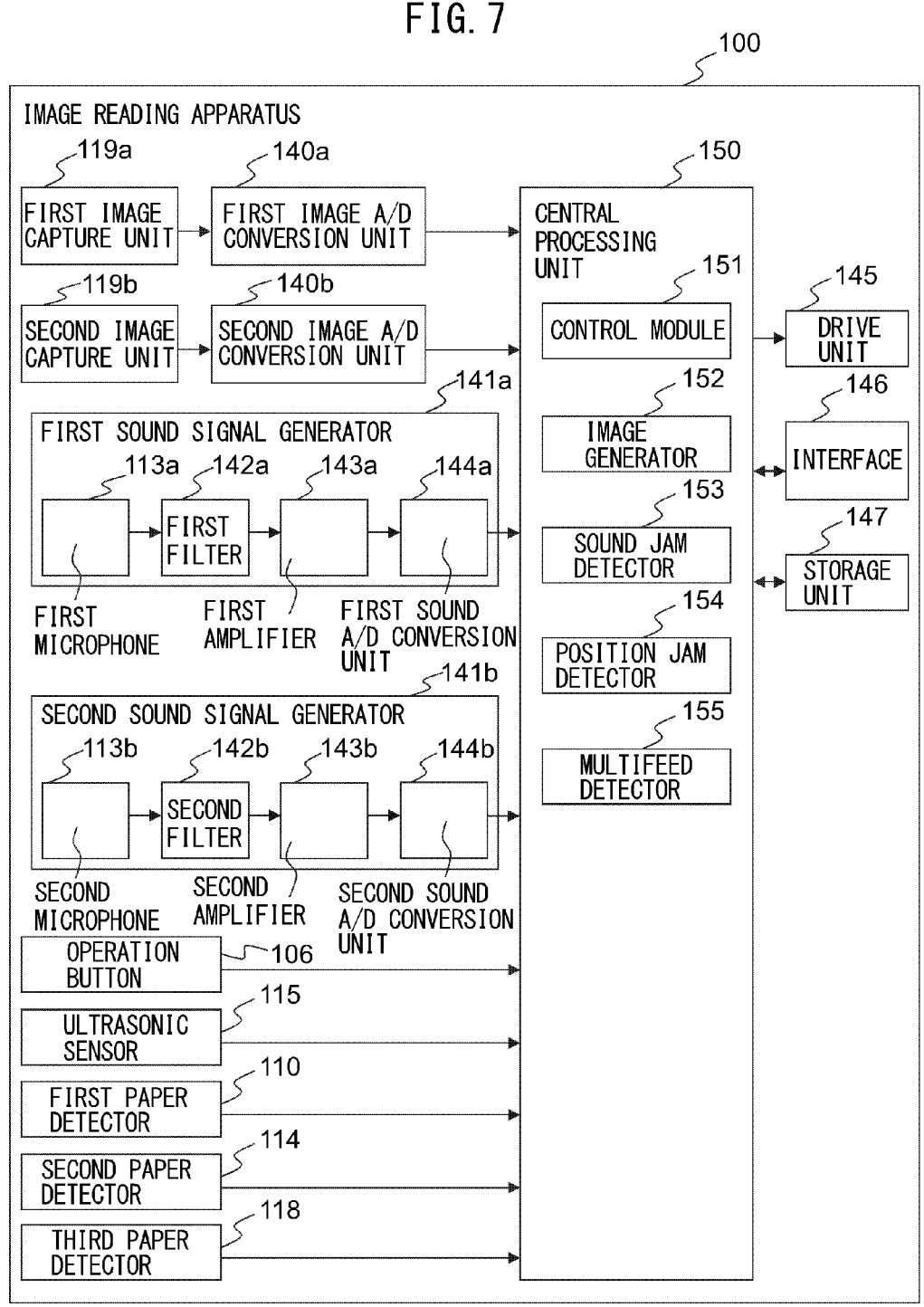
FIG. 7 is an example of a block diagram which shows a schematic configuration of an image reading apparatus 100.

FIG. 7 is an example of a block diagram which shows the general configuration of an image reading apparatus 100.

The image reading apparatus 100, in addition to the above-mentioned configuration, further has a first image A/D conversion unit 140a, a second image A/D conversion unit 140b, a first sound signal generator 141a, a second sound signal generator 141b, a drive unit 145, an interface 146, a storage unit 147, a central processing unit 150, etc.

The first image A/D conversion unit 140a converts an analog image signal which is output from the first image capture unit 119a from an analog to digital format to generate digital image data which it then outputs to the central processing unit 150. Similarly, the second image A/D conversion unit 140b converts the analog image signal which is output from the second image capture unit 119b from an analog to digital format to generate digital image data which it then outputs to the central processing unit 150. Below, these digital image data will be referred to as the "read image".

A first sound signal generator 141a includes the first microphone 113a, a first filter 142a, a first amplifier 143a, a first sound A/D conversion unit 144a, etc., and generates a first sound signal. The first filter 142a filters the analog signal which is output from the first microphone 113a by a bandpass filter which passes a predetermined frequency band of the signal and outputs it to the first amplifier 143a. The first amplifier 143a amplifies the signal which is output from the first filter 142a and outputs it to the first sound A/D conversion unit 144a. The first sound A/D conversion unit 144a converts the analog signal which is output from the first amplifier 143a to a digital signal and outputs it to the central processing unit 150. Below, the signal which the first sound signal generator 141a outputs will be called the "first sound signal".

Note that, the first sound signal generator 141a is not limited to this. The first sound signal generator 141a may also include just the first microphone 113a, while the first filter 142a, the first amplifier 143a, and the first sound A/D conversion unit 144a may be provided at the outside of the first sound signal generator 141a. Further, the first sound signal generator 141a may also include just the first microphone 113a and the first filter 142a or just the first microphone 113a, the first filter 142a, and the first amplifier 143a.

A second sound signal generator 141b includes the second microphone 113b, the second filter 142b, the second amplifier 143b, the second sound A/D conversion unit 144b, etc., and generates a second sound signal. The second filter 142b filters the analog signal which is output from the second microphone 113b by a bandpass filter which passes a predetermined frequency band of the signal and outputs it to the second amplifier 143b. The second amplifier 143b amplifies the signal which is output from the second filter 142b and outputs it to the second sound A/D conversion unit 144b. The second sound A/D conversion unit 144b converts the analog signal which is output from the second amplifier 143b to a digital second sound signal and outputs it to the central processing unit 150. Below, the signal which the second sound signal generator 141b outputs will be called the "second sound signal".

Note that, the second sound signal generator 141b is not limited to this. The second sound signal generator 141b may include just the second microphone 113b, while the second filter 142b, the second amplifier 143b, and the second sound A/D conversion unit 144b may be provided at the outside of the second sound signal generator 141b. Further, the second sound signal generator 141b may include just the second microphone 113b and the second filter 142b or just the second microphone 113b, the second filter 142b, and the second amplifier 143b.

The drive unit 145 includes one or more motors and uses control signals from the central processing unit 150 to rotate the paper feed roller 111, the retard roller 112, the first conveyor roller 116, and the second conveyor roller 121 and operate to convey a paper.

The interface 146 has, for example, a USB or other serial bus-based interface circuit and electrically connects with a not shown information processing apparatus (for example, personal computer, portable data terminal, etc.) to send and receive a read image and various types of information. Further, it is also possible to connect a flash memory etc., to the interface 146 so as to store the read image.

The storage unit 147 has a RAM (random access memory), ROM (read only memory), or other memory device, a hard disk or other fixed disk device, or flexible disk, optical disk, or other portable storage device. Further, the storage unit 147 stores a computer program, database, tables, etc., which are used in various processing of the image reading apparatus 100. The computer program may be installed on the storage unit 147 from a computer-readable, non-transitory medium such as a compact disk read only memory (CD-ROM), a digital versatile disk read only memory (DVD-ROM), or the like by using a well-known setup program or the like. Furthermore, the storage unit 147 stores the read image.

The central processing unit 150 is provided with a CPU (central processing unit) and operates based on a program which is stored in advance in the storage unit 147. Note that, the central processing unit 150 may also be comprised of a DSP (digital signal processor), LSI (large scale integrated circuit), ASIC (application specific integrated circuit), FPGA (field-programming gate array), etc.

The central processing unit 150 is connected to the operation button 106, first paper detector 110, second paper detector 114, ultrasonic sensor 115, third paper detector 118, first image capture unit 119a, second image capture unit 119b, first image A/D conversion unit 140a, second image A/D conversion unit 140b, first sound signal generator 141a, second sound signal generator 141b, drive unit 145, interface 146, and storage unit 147 and controls these parts.

The central processing unit 150 control a drive operation of the drive unit 145, control a paper read operation of the image capture unit 119, etc., to acquire a read image. Further, the central processing unit 150 has a control module 151, an image generator 152, a sound jam detector 153, a position jam detector 154, a multifeed detector 155, etc. These units are functional modules which are realized by software which operate on a processor. Note that, these units may be comprised of respectively independent integrated circuits, a microprocessor, firmware, etc.

Figure 8:
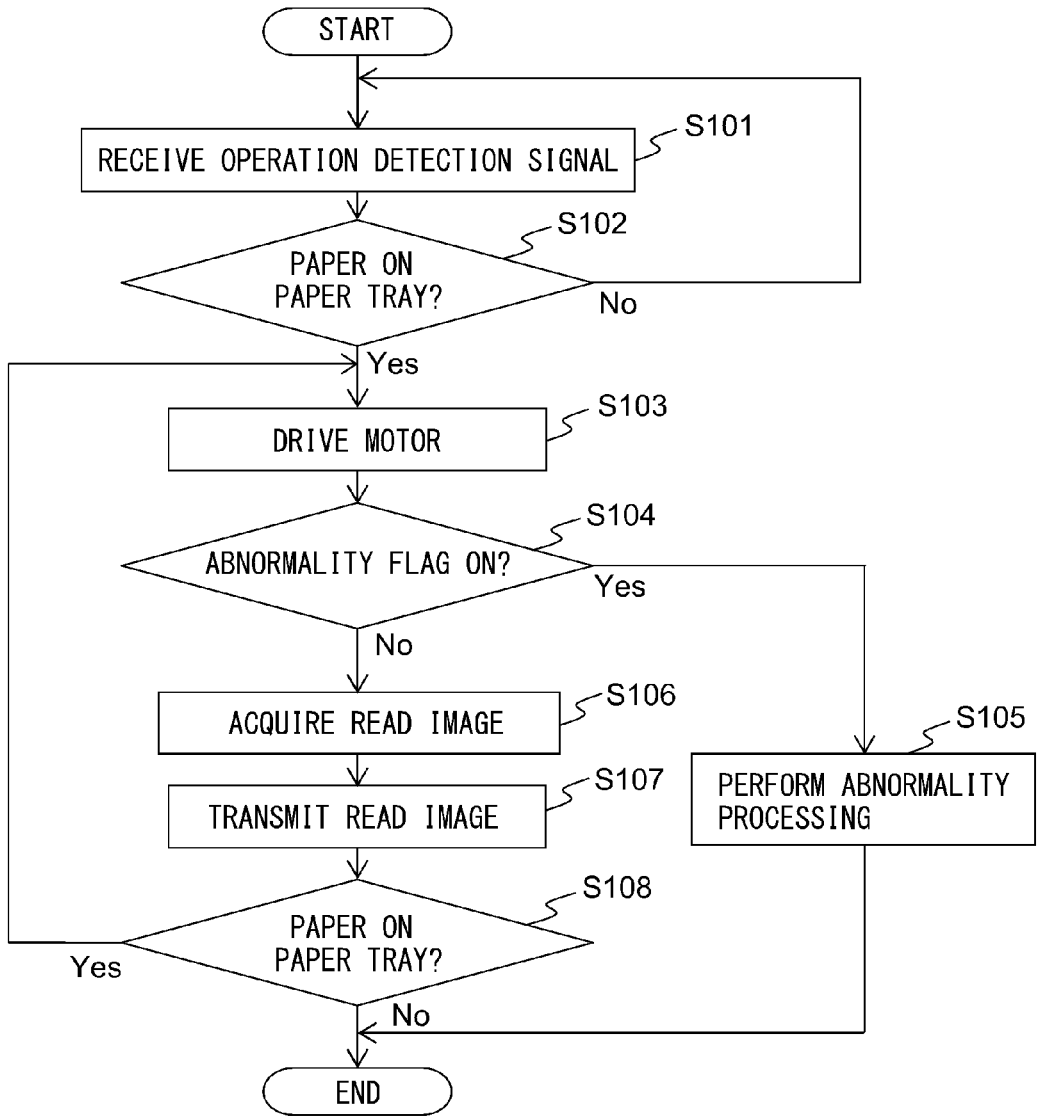
FIG. 8 is a flow chart which shows an example of an operation of overall processing of an image reading apparatus 100.

FIG. 8 is a flow chart which shows an example of operation of overall processing of the image reading apparatus 100.

Below, referring to the flow chart which is shown in FIG. 8, an example of the operation of the overall processing of the image reading apparatus 100 will be explained. Note that, the flow of the operation which is explained below is performed based on a program which is stored in advance in the storage unit 147 mainly by the central processing unit 150 in cooperation with the elements of the image reading apparatus 100.

First, the central processing unit 150 stands by until a user pushes the operation button 106 and an operation detection signal is received from the operation button 106 (step S101).

Next, the central processing unit 150 determines whether the paper tray 103 has a paper placed on it based on the first paper detection signal which was received from the first paper detector 110 (step S102).

If the paper tray 103 does not have a paper placed on it, the central processing unit 150 returns the processing to step S101 and stands by until newly receiving an operation detection signal from the operation button 106.

On the other hand, when the paper tray 103 has a paper placed on it, the central processing unit 150 drives the drive unit 145 to rotate the paper feed roller 111, retard roller 112, first conveyor roller 116, and second conveyor roller 121 and convey the paper (step S103).

Next, the control module 151 determines whether an abnormality flag is ON or not (step S104). This abnormality flag is set OFF at the time of startup of the image reading apparatus 100 and is set ON if a later explained abnormality detection processing determines that an abnormality has occurred.

When the abnormality flag is ON, the control module 151, as an abnormal processing, stops the drive unit 145 to stop the conveyance of the paper, uses a not shown speaker, LED (light emitting diode), etc. to notify the user of the occurrence of an abnormality, sets the abnormality flag OFF (step S105), and ends the series of steps.

On the other hand, when the abnormality flag is not ON, the image generator 152 makes the first image capture unit 120a and the second image capture unit 120b read the conveyed paper and acquires the read image through the first image A/D conversion unit 140a and the second image A/D conversion unit 140b (step S106).

Next, the central processing unit 150 transmits the acquired read image through the interface 146 to a not shown information processing apparatus (step S107). Note that, when not connected to an information processing apparatus, the central processing unit 150 stores the acquired read image in the storage unit 147.

Next, the central processing unit 150 determines whether the paper tray 103 has a paper remaining thereon based on the first paper detection signal which was received from the first paper detector 110 (step S108).

When the paper tray 103 has a paper remaining thereon, the central processing unit 150 returns the processing to step S103 and repeats the processing of steps S103 to S108. On the other hand, when the paper tray 103 does not have any paper remaining thereon, the central processing unit 150 ends the series of processing.

Figure 9:
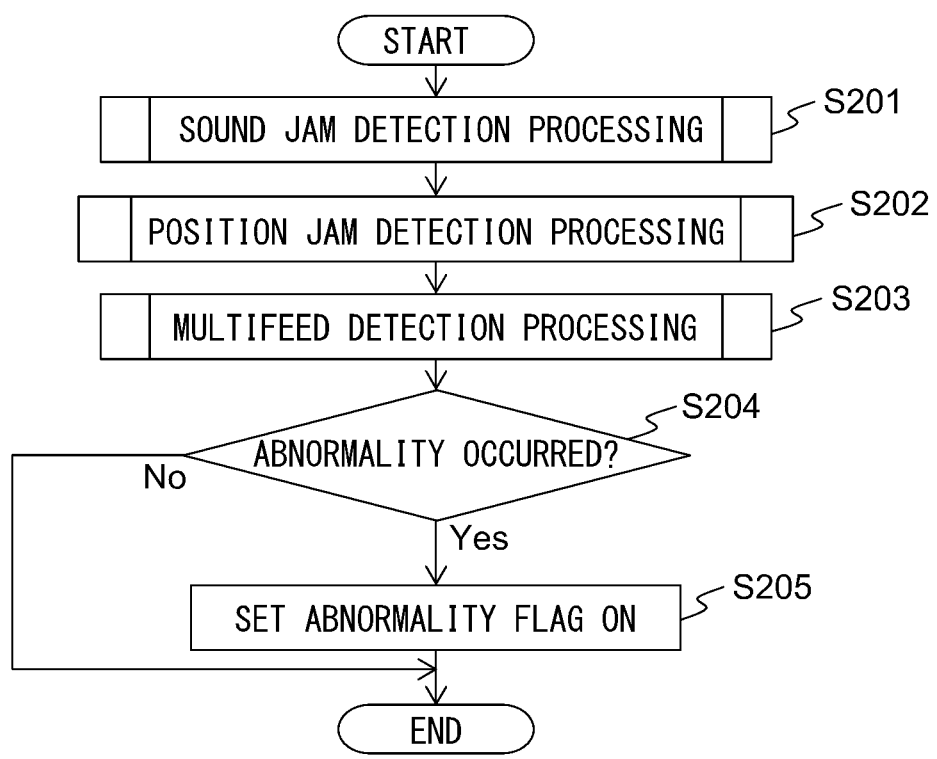
FIG. 9 is a flow chart which shows an example of an abnormality detection of the paper conveyance.

FIG. 9 is a flow chart which shows an example of an abnormality detection of the paper conveyance of the image reading apparatus 100.

The flow of operation which is explained below is executed based on a program which is stored in advance in the storage unit 147 mainly by the central processing unit 150 in cooperation with the elements of the image reading apparatus 100.

First, the sound jam detector 153 executes sound jam detection processing (step S201). In the sound jam detection processing, the sound jam detector 153 determines whether a jam has occurred based on the first sound signal which is acquired from the first sound signal generator 141*a* and the second sound signal which is acquired from the second sound signal generator 141*b*. Below, sometimes a jam which is determined to exist by the sound jam detector 153 based on the first sound signal and the second sound signal will be called a "sound jam". Details of the sound jam detection processing will be explained later.

Next, the position jam detector 154 performs position jam detection processing (step S202). In the position jam detection processing, the position jam detector 154 determines the occurrence of a jam based on the second paper detection signal which is acquired from the second paper detector 114 and the third paper detection signal which is acquired from the third paper detector 118. Below, sometimes a jam which is determined to exist by the position jam detector 154 based on the second paper detection signal and third paper detection signal will be called a "position jam". Details of the position jam detection processing will be explained later.

Next, the multifeed detector 155 performs multifeed detection processing (step S203). In the multifeed detection processing, the multifeed detector 155 determines the occurrence of a multifeed of papers based on the ultrasonic signal which was acquired from the ultrasonic sensor 115. Details of the multifeed detection processing will be explained later.

Next, the control module 151 determines whether an abnormality has occurred in the paper conveyance processing (step S204). The control module 151 determines that an abnormality has occurred if at least one of a sound jam, position jam, and paper multifeed has occurred. That is, it is determined that no abnormality has occurred when none of a sound jam, position jam, or paper multifeed has occurred.

The control module 151 sets the abnormality flag to ON (step S205) and ends the series of steps when an abnormality occurs in the paper conveyance processing. On the other hand, when no abnormality occurs in the paper conveyance processing, it ends the series of steps without particularly performing any further processing. Note that, the flow chart which is shown in FIG. 5 is repeatedly executed every predetermined time interval.

Figure 10:
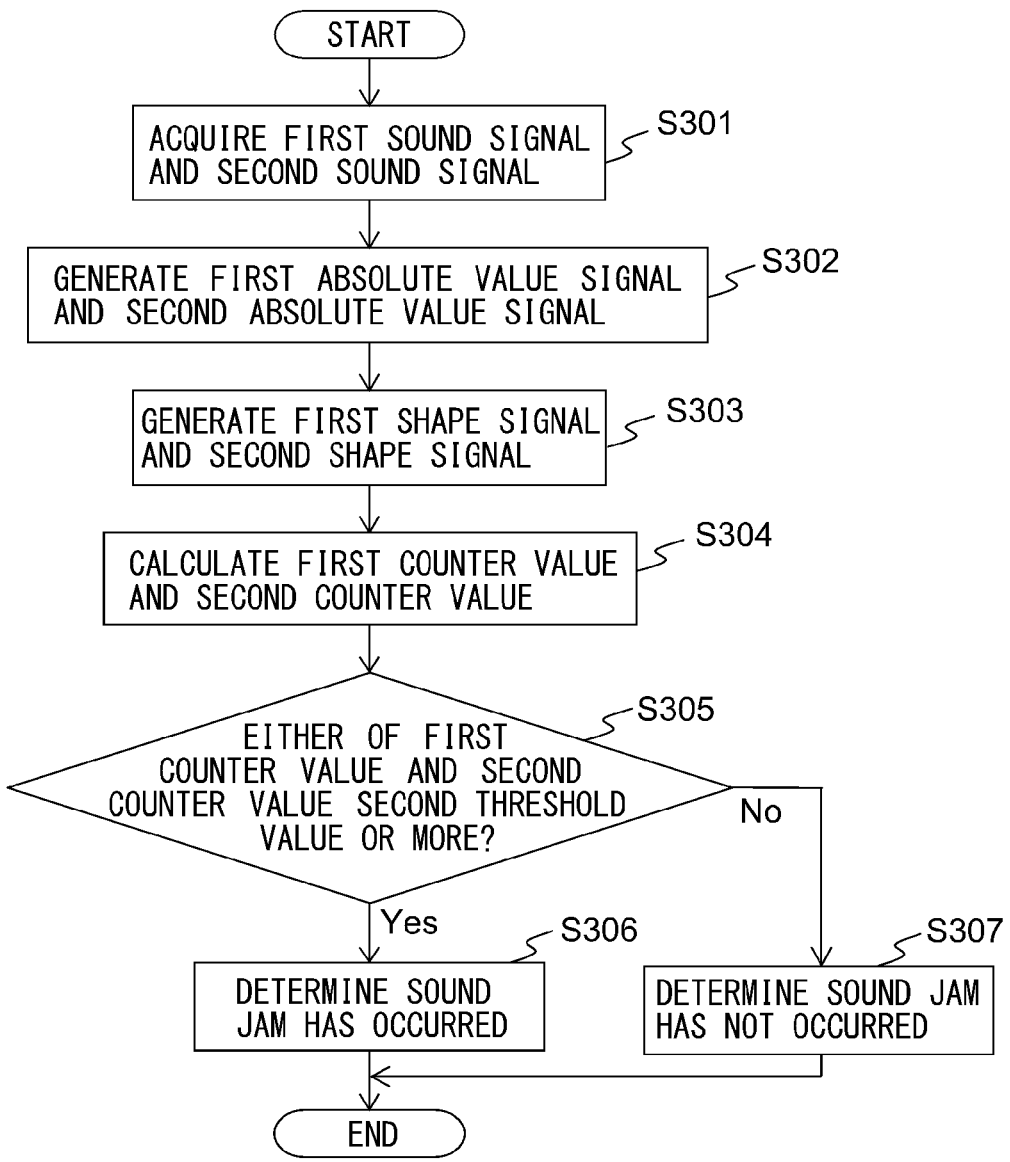
FIG. 10 is a flow chart which shows an example of operation of sound jam detection processing.

FIG. 10 is a flow chart which shows an example of operation of a sound jam detection processing.

The flow of operation which is shown in FIG. 10 is executed at step S201 of the flow chart which is shown in FIG. 9.

First, the sound jam detector 153 acquires the first sound signal from the first sound signal generator 141*a* and acquires the second sound signal from the second sound signal generator 141*b* (step S301).

Next, the sound jam detector 153 generates a first absolute value signal of the absolute value of the first sound signal and a second absolute value signal of the absolute value of the second sound signal (step S302).

Next, the sound jam detector 153 generates a first shape signal which extracts the shape of the first absolute value signal and a second shape signal which extracts the shape of the second absolute value signal (step S303). The sound jam detector 153 generates signals acquiring the peak holds of the first absolute value signal and second absolute value signal as the first shape signal and second shape signal. The sound jam detector 153 holds the local maximum values of the absolute value signals for exactly certain hold periods and then causes them to attenuate by certain attenuation rates to generate the shape signals.

Next, the sound jam detector 153 calculates a first counter value which it increases when the signal value of the first shape signal is the first threshold value Th1 or more and which it decreases when it is less than the first threshold value Th1. Similarly, the sound jam detector 153 calculates a second counter value which it increases when the signal value of the second shape signal is the first threshold value Th1 or more and which it decreases when it is less than the first threshold value Th1.

The sound jam detector 153 determines whether the signal value of the first shape signal is the first threshold value Th1 or more at every predetermined time interval (for example, sound signal sampling interval), increments the first counter value if the signal value of the first shape signal is the first threshold value Th1 or more, and decrements the first counter value if it is less than the first threshold value Th1. Similarly, the sound jam detector 153 determines whether the signal value of the second shape signal is the first threshold value Th1 or more at every predetermined time interval, increments the second counter value if the signal value of the second shape signal is the first threshold value Th1 or more, and decrements the second counter value if it is less than the first threshold value Th1.

Next, the sound jam detector 153 determines whether at least one of the first counter value and second counter value is the second threshold value Th2 or more (step S305).

The sound jam detector 153 determines that a sound jam has occurred if at least one of the first counter value and second counter value is the second threshold value Th2 or more (step S306). On the other hand, the sound jam detector 153 determines that a sound jam has not occurred if both of the first counter value and second counter value are less than the second threshold value Th2 (step S307) and ends the series of steps.

Below, the results of detection of a sound jam in the case of arranging the first microphone 113*a* and second microphone 113*a* like in the present embodiment will be explained in comparison with the results of detection of a sound jam in the case of arranging them at other positions.

Figure 11:
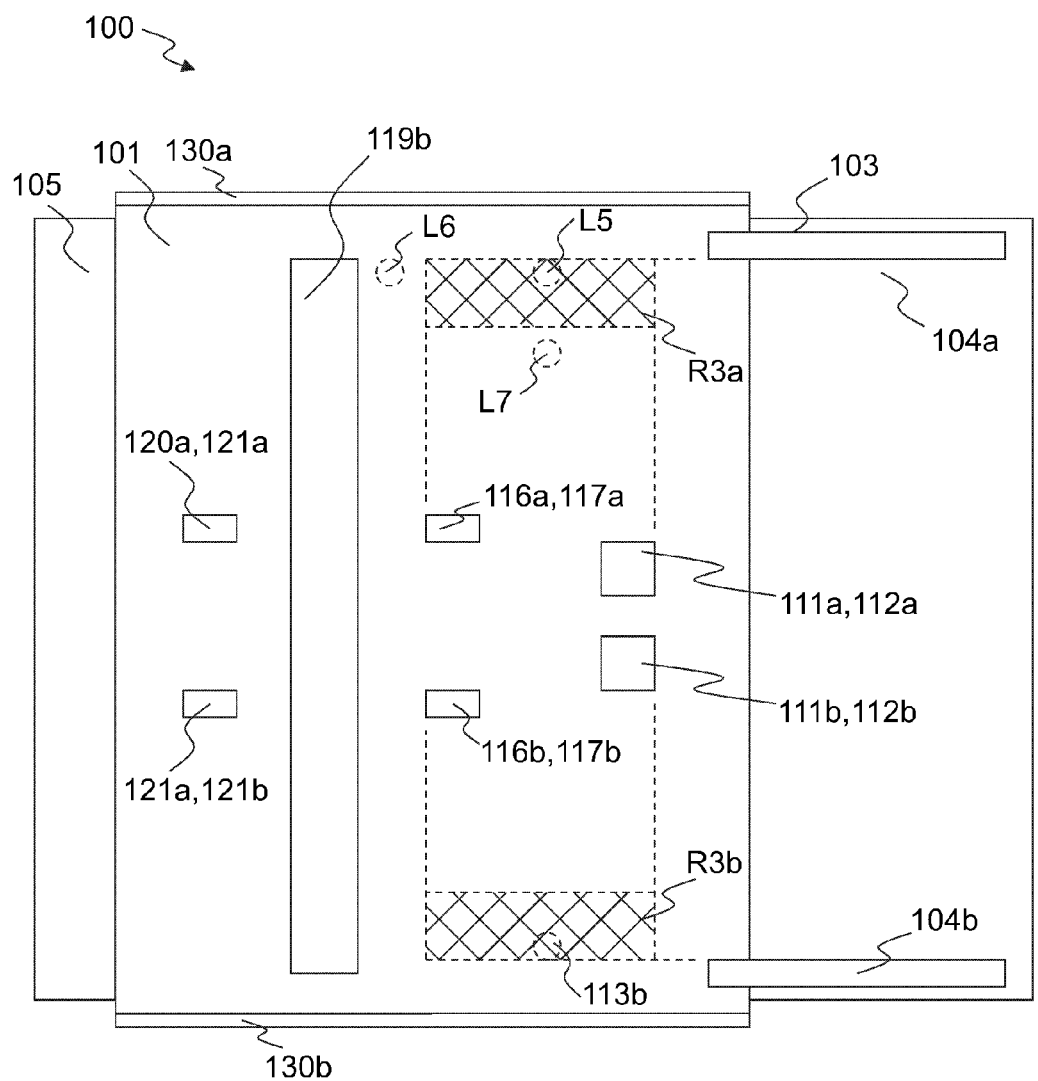

FIG. 11 is a view for explaining the position of arrangement of the first microphone 113*a*.

The position L5 is a position at the center between the paper feed rollers 111 and retard rollers 112, and the first conveyor rollers 116 and first driven rollers 117 in the conveyance direction of the paper and a position 25 mm from the side wall 130*a* in the direction which perpendicularly intersects the conveyance direction of the paper. That is, the position L5 is a position which is included in the region R3*a* of FIG. 4 and which enables effective detection of both sound which is generated due to a skew jam and sound which is generated due to a staple jam.

The position L6 is a position at the downstream side of the first conveyor rollers 116 and first driven rollers 117 in the conveyance direction of the paper and a position 25 mm from the side wall 130a in the direction which perpendicularly intersects the conveyance direction of the paper. That is, the position L6 is a position which is not included in the region R3a and which enables effective detection of a sound which is generated due to a skew jam, but does not enable effective detection of sound which is generated due to a staple jam.

The position L7 is a position at the center between the paper feed rollers 111 and retard rollers 112, and the first conveyor rollers 116 and first driven rollers 117 and a position 60 mm from the side wall 130a in the direction which perpendicularly intersects the conveyance direction of the paper. That is, the position L7 is a position which is not included in the region R3a and which enables effective detection of a sound which is generated due to a staple jam, but does not enable effective detection of sound which is generated due to a skew jam.

FIG. 12 give graphs which show examples of the signals for detection of a sound jam in the case where the first microphone 113a is arranged at the position L5 of FIG. 11 and a skew jam has occurred.

Figure 12A:
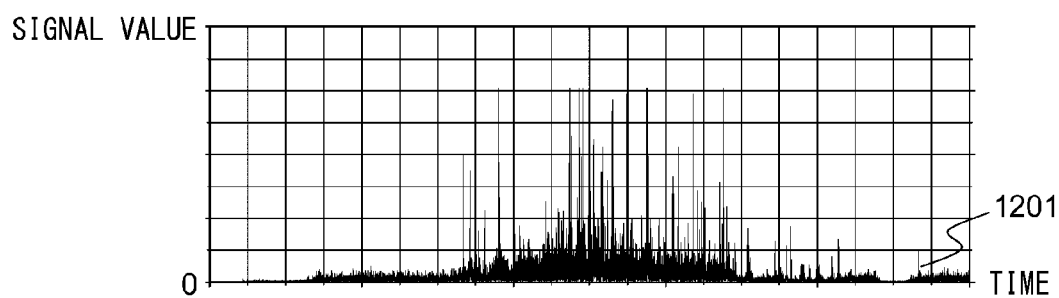
FIG. 12A is a graph which shows an example of a first absolute value signal at the time of occurrence of a skew jam.
Figure 12B:
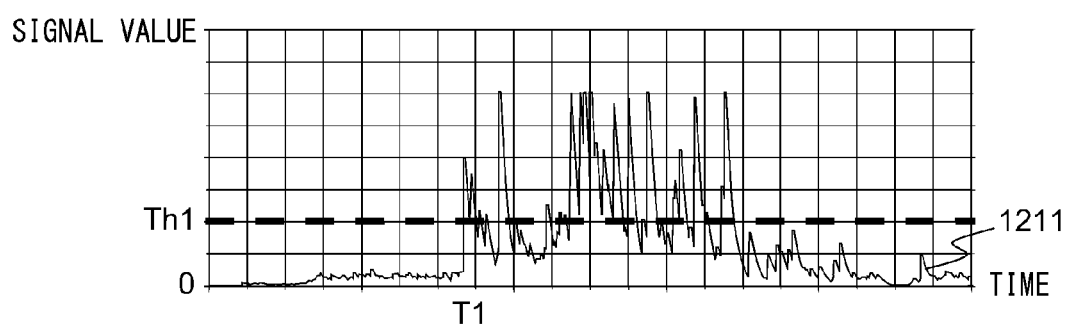
FIG. 12B is a graph which shows an example of a first shape signal at the time of occurrence of a skew jam.
Figure 12C:
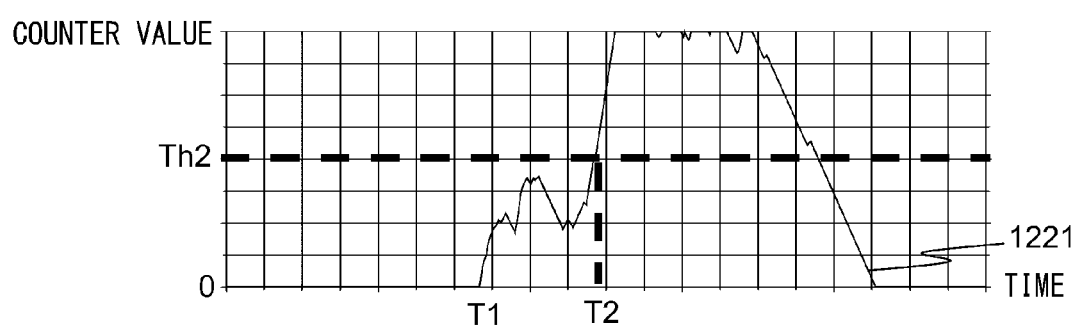
FIG. 12C is a graph which shows an example of a first counter value at the time of occurrence of a skew jam.

In FIG. 12A, FIG. 12B, and FIG. 12C, the abscissas show the time, in FIG. 12A and FIG. 12B, the ordinates show the signal value, and in FIG. 12C, the ordinate shows the counter value. The graph of FIG. 12A shows an example of the first absolute value signal 1201 in the case where the first microphone 113a is arranged at the position L5 of FIG. 11 and, as shown in FIG. 5, the paper strikes the side wall 130a near the first microphone 113a and a skew jam occurs. The graph of FIG. 12B shows an example of the first shape signal 1211 which is generated from the first absolute value signal 1201. The graph of FIG. 12C shows an example of the first counter value 1221 which is calculated for the first shape signal 1211.

In FIG. 12B, the first shape signal 1211 becomes the first threshold value Th1 or more at the time T1 and frequently becomes the first threshold value Th1 or more after that. As shown in FIG. 12C, the first counter value 1221 increases from the time T1, repeatedly increases and decreases after that, and becomes the second threshold value Th2 or more at the time T2, whereby it is determined that a sound jam has occurred.

FIG. 13 give graphs which show examples of signals for detection of a sound jam in the case where the first microphone 113a is arranged at the position L5 of FIG. 11 and a staple jam has occurred.

In FIG. 13A, FIG. 13B, and FIG. 13C, the abscissas show the time, in FIG. 13A and FIG. 13B, the ordinates show the signal value, and in FIG. 13C, the ordinate shows the counter value. The graph of FIG. 13A shows an example of the first absolute value signal 1301 in the case where the first microphone 113a is arranged at the position L5 of FIG. 11 and, as shown in FIG. 6, a staple jam has occurred due to a paper conveyed with the part fastened by a staple at the first microphone 113a side. The graph of FIG. 13B shows an example of the first shape signal 1311 which is generated from the first absolute value signal 1301. The graph of FIG. 13C shows an example of the first counter value 1321 which is calculated for the first shape signal 1311.

In FIG. 13B, the first shape signal 1311 becomes the first threshold value Th1 or more at the time T3 and frequently becomes the first threshold value Th1 or more after that. As shown in FIG. 13C, the first counter value 1321 increases from the time T3, repeatedly increases and decreases after that, and becomes the second threshold value Th2 or more at the time T4, whereby it is determined that a sound jam has occurred.

In the above way, when the first microphone 113a is arranged at the position L5 of FIG. 11, the sound jam detector 153 can determine that a sound jam has occurred both when a skew jam has occurred and when a staple jam has occurred.

FIG. 14 gives graphs which show examples of signals for detection of a sound jam in the case where the first microphone 113a is arranged at the position L6 of FIG. 11 and a skew jam has occurred.

Figure 14A:
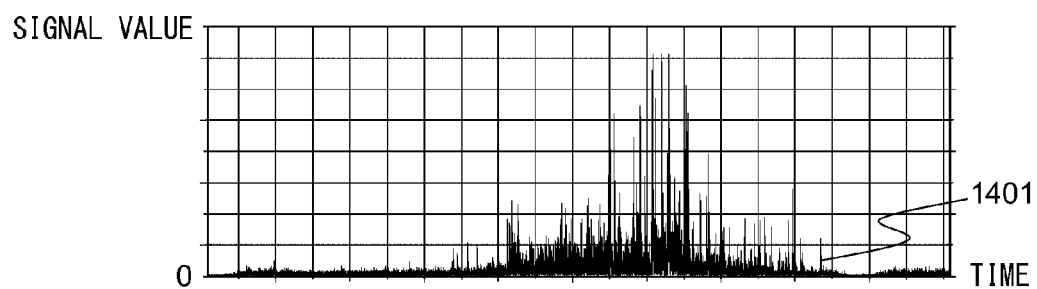
FIG. 14A is a graph which shows an example of a first absolute value signal at the time of occurrence of a skew jam.
Figure 14B:
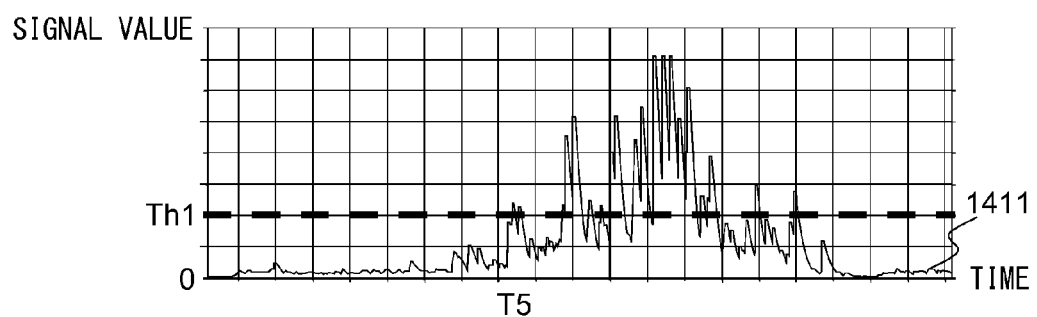
FIG. 14B is a graph which shows an example of a first shape signal at the time of occurrence of a skew jam.
Figure 14C:
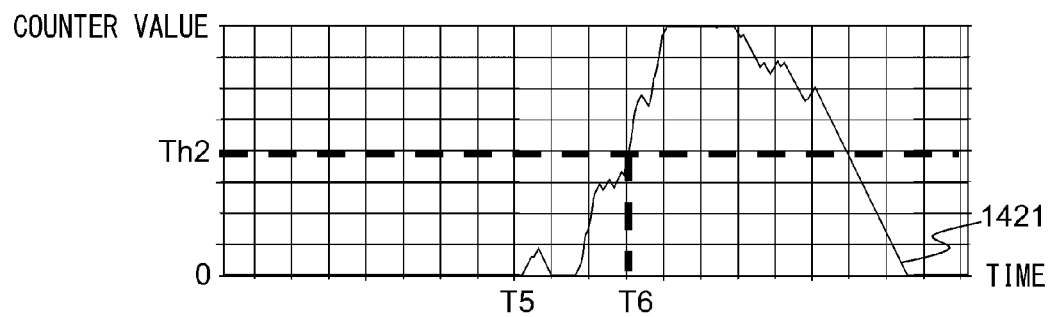
FIG. 14C is a graph which shows an example of a first counter value at the time of occurrence of a skew jam.

In FIG. 14A, FIG. 14B, and FIG. 14C, the abscissas show the time, in FIG. 14A and FIG. 14B, the ordinates show the signal value, and in FIG. 14C, the ordinate shows the counter value. The graph of FIG. 14A shows an example of the first absolute value signal 1401 in the case where the first microphone 113a is arranged at the position L6 of FIG. 11 and, as shown in FIG. 5, the paper strikes the side wall 140a near the first microphone 114a and a skew jam has occurred. The graph of FIG. 14B shows an example of the first shape signal 1411 which is generated from the first absolute value signal 1401. The graph of FIG. 14C shows an example of the first counter value 1421 which is calculated for the first shape signal 1411.

In FIG. 14B, the first shape signal 1411 becomes the first threshold value Th1 or more at the time T5 and frequently becomes the first threshold value Th1 or more after that. As shown in FIG. 14C, the first counter value 1421 increases from time T5, repeatedly increases and decreases after that, and becomes the second threshold value Th2 or more at the time T6 whereby it is determined that a sound jam has occurred.

FIG. 15 give graphs which show examples of the signals for sound jam detection in the case where the first microphone 113a is arranged at the position L6 of FIG. 11 and a staple jam has occurred.

Figure 15A:
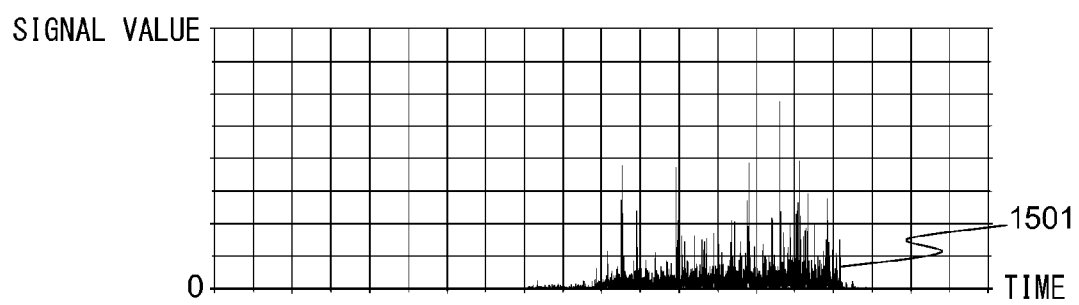
FIG. 15A is a graph which shows an example of a first absolute value signal at the time of occurrence of a staple jam.
Figure 15B:
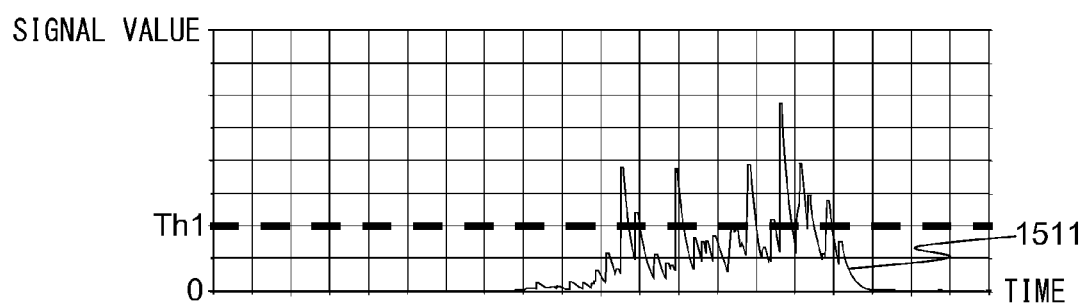
FIG. 15B is a graph which shows an example of a first shape signal at the time of occurrence of a staple jam.
Figure 15C:
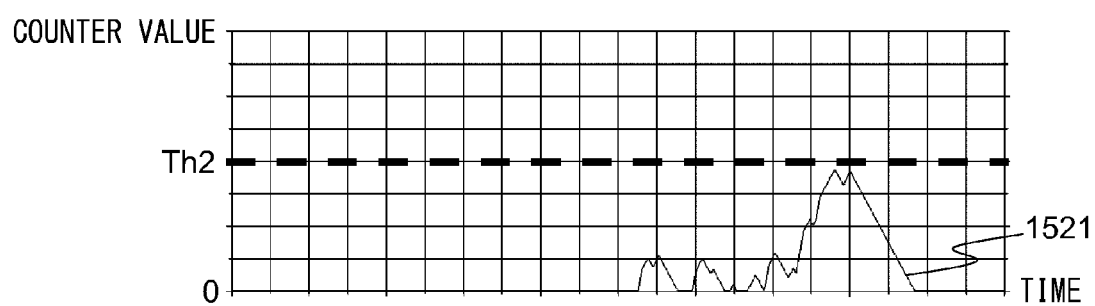
FIG. 15C is a graph which shows an example of a first counter value at the time of occurrence of a staple jam.

In FIG. 15A, FIG. 15B, and FIG. 15C, the abscissas show the time, in FIG. 15A and FIG. 15B, the ordinates show the signal value, and in FIG. 15C, the ordinate shows the counter value. The graph of FIG. 15A shows an example of the first absolute value signal 1501 in the case where the first microphone 113a is arranged at the position L6 of FIG. 11 and, as shown in FIG. 6, a staple jam has occurred due to a paper which is conveyed with the part fastened by a staple at the first microphone 113a side. The graph of FIG. 15B shows an example of the first shape signal 1511 which is generated from the first absolute value signal 1501. The graph of FIG. 15C shows an example of the first counter value 1521 which is calculated for the first shape signal 1511.

As shown in FIG. 15B, the first shape signal 1511 frequently does not become the first threshold value Th1 or more. As shown in FIG. 15C, the first counter value 1521 does not become the second threshold value Th2 or more, so it is determined that a sound jam has not occurred.

In the above way, when the first microphone 113a is arranged at the position L6 of FIG. 11, the sound jam detector 153 can detect a skew jam, but cannot detect a staple jam.

FIG. 16 give graphs which show examples of signals for sound jam detection in the case where the first microphone 113a is arranged at the position L7 of FIG. 11 and a staple jam occurs.

Figure 16A:
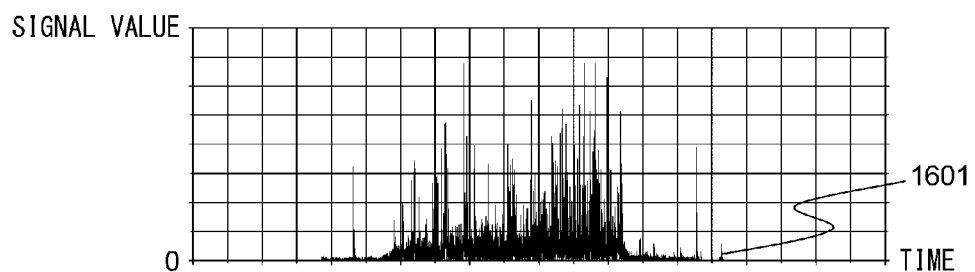
FIG. 16A is a graph which shows an example of a first absolute value signal at the time of occurrence of a staple jam.
Figure 16B:
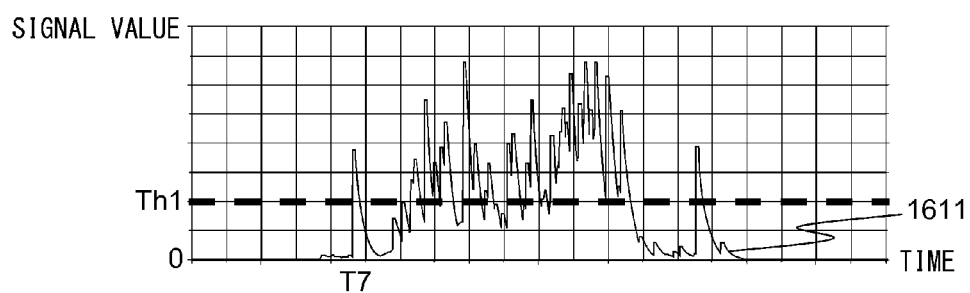
FIG. 16B is a graph which shows an example of a first shape signal at the time of occurrence of a staple jam.
Figure 16C:
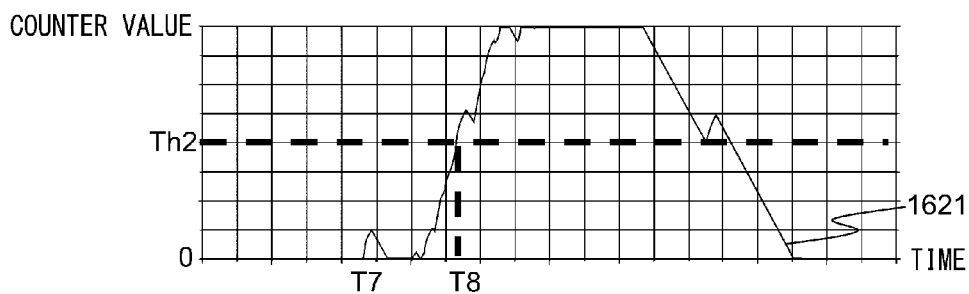
FIG. 16C is a graph which shows an example of a first counter value at the time of occurrence of a staple jam.

In FIG. 16A, FIG. 16B, and FIG. 16C, the abscissas show the time, in FIG. 16A and FIG. 16B, the ordinates show the signal value, and in FIG. 16C, the ordinate shows the counter value. The graph of FIG. 16A shows an example of the first absolute value signal 1601 in the case where the first microphone 113a is arranged at the position L7 of FIG. 11 and, as shown in FIG. 6, a staple jam has occurred due to a paper which is conveyed with the part fastened by a staple at the first microphone 113a side. The graph of FIG. 16B shows an example of the first shape signal 1611 which is generated from the first absolute value signal 1601. The graph of FIG. 16C shows an example of the first counter value 1621 which is calculated for the first shape signal 1611.

In FIG. 16B, the first shape signal 1611 becomes a first threshold value Th1 or more at the time T7 and frequently becomes the first threshold value Th1 or more after that. As shown in FIG. 16C, the first counter value 1621 is increased from the time T7, repeatedly increases and decreases after that, and becomes the second threshold value Th2 or more at the time T8, so it is determined that a sound jam has occurred.

FIG. 17 gives graphs which show examples of signals for detection of a sound jam in the case where the first microphone 113a is arranged at the position L7 of FIG. 11 and a skew jam has occurred.

Figure 17A:
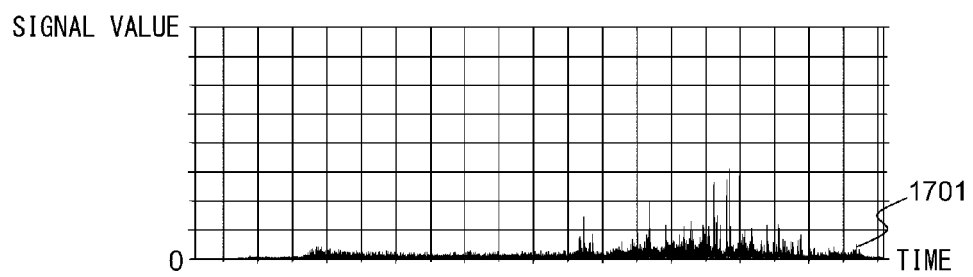
FIG. 17A is a graph which shows an example of a first absolute value signal at the time of occurrence of a skew jam.
Figure 17B:
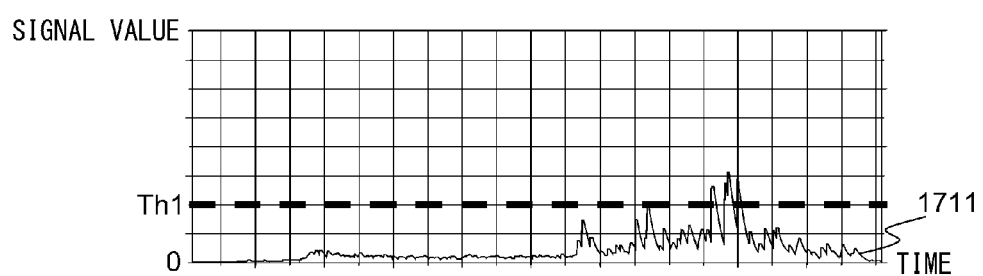
FIG. 17B is a graph which shows an example of a first shape signal at the time of occurrence of a skew jam.
Figure 17C:
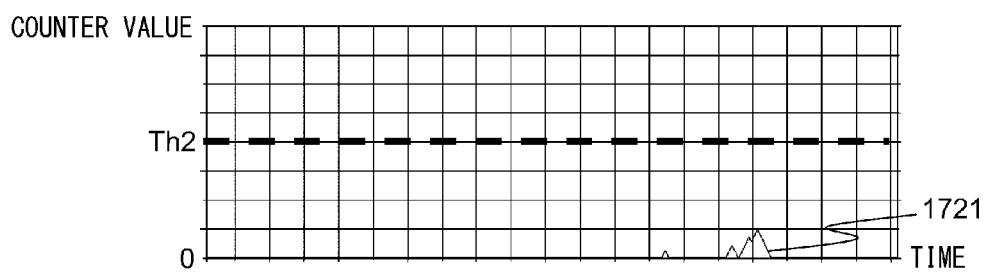
FIG. 17C is a graph which shows an example of a first counter value at the time of occurrence of a skew jam.

In FIG. 17A, FIG. 17B, and FIG. 17C, the abscissas show the time, in FIG. 17A and FIG. 17B, the ordinates show the signal value, and, in FIG. 17C, the ordinate shows the counter value. The graph of FIG. 17A shows an example of the first absolute value signal 1701 in the case where the first microphone 113a is arranged at a position L7 of FIG. 11, as shown in FIG. 5, the paper strikes the side wall 130a near the first microphone 113a, and a skew jam has occurred. The graph of FIG. 17B shows an example of the first shape signal 1711 which is generated from the first absolute value signal 1701. The graph of FIG. 17C shows an example of the first counter value 1721 which is calculated for the first shape signal 1711.

As shown in FIG. 17B, the first shape signal 1711 frequently does not become the first threshold value Th1 or more. As shown in FIG. 17C, the first counter value 1721 does not become the second threshold value Th2 or more and it is determined that no sound jam has occurred.

In the above way, when the first microphone 113a is arranged at the position L7 of FIG. 11, the sound jam detector 153 can detect a staple jam, but cannot detect a skew jam.

Figure 18:
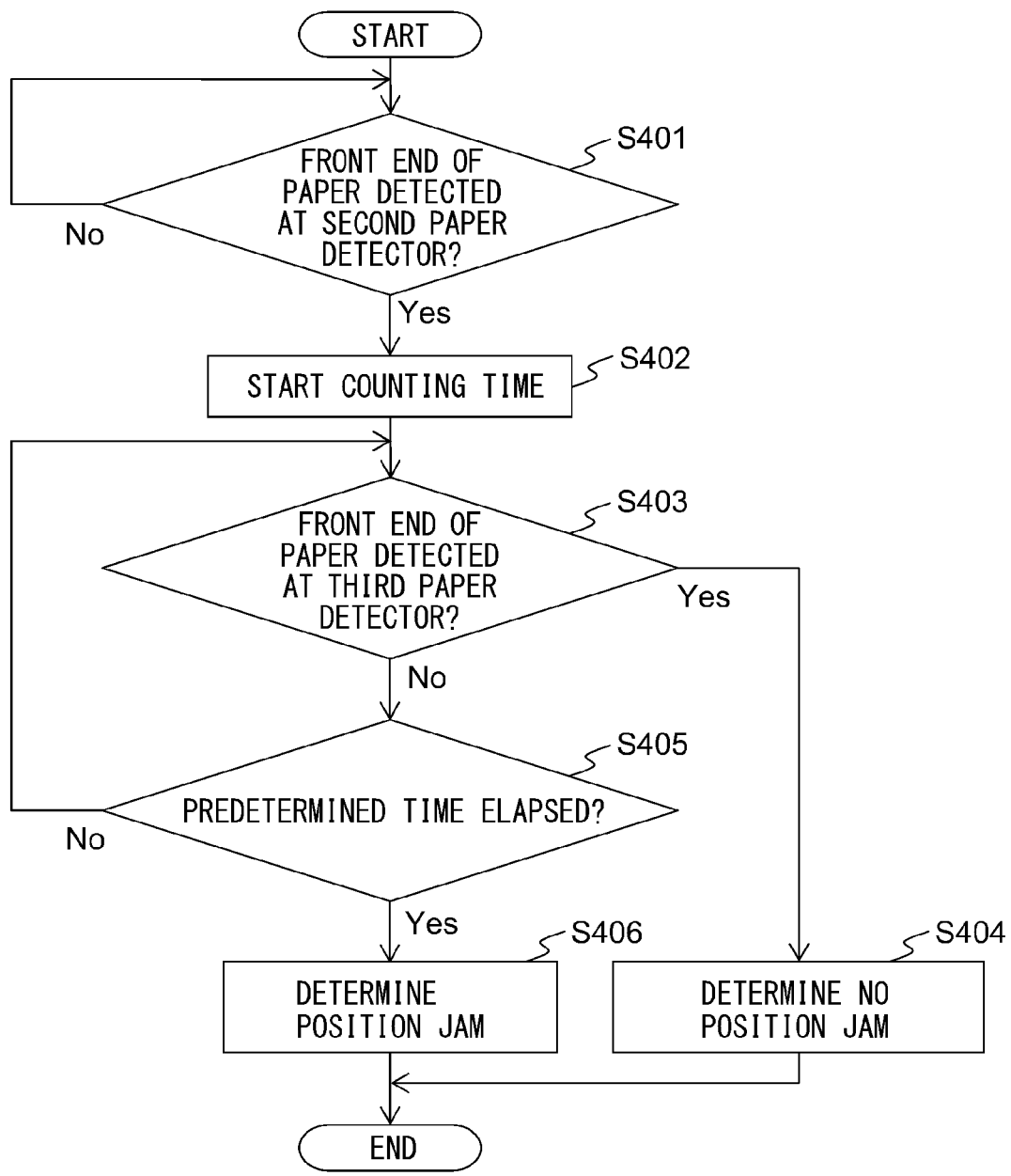
FIG. 18 is a flow chart which shows an example of operation of position jam detection processing.

FIG. 18 is a flow chart which shows an example of operation of a position jam detection processing.

The flow of operation which is shown in FIG. 18 is executed at step S202 of the flow chart which is shown in FIG. 9.

First, the position jam detector 154 stands by until the front end of the paper is detected by the second paper detector 114 (step S401). The position jam detector 154 determines that the front end of the paper is detected at the position of the second paper detector 114, that is, downstream of the paper feed roller 111 and retard roller 112 and upstream of the first conveyor roller 116 and first driven roller 117, when the value of the second paper detection signal from the second paper detector 114 changes from a value which shows the state where there is no paper to a value which shows the state where there is one.

Next, when the second paper detector 114 detects the front end of a paper, the position jam detector 154 starts counting time (step S402).

Next, the position jam detector 154 determines whether the third paper detector 118 has detected the front end of the paper (step S403). The position jam detector 154 determines that the front end of the paper is detected at the position of the third paper detector 118, that is, downstream of the first conveyor roller 116 and first driven roller 117 and upstream of the image capture unit 119, when the value of the third paper detection signal from the third paper detector 118 changes from a value which shows the state where there is no paper to a value which shows the state where there is one.

When the third paper detector 118 detects the front end of a paper, the position jam detector 154 determines that no position jam has occurred (step S404) and ends the series of steps.

On the other hand, if the third paper detector 118 detects the front end of the paper, the position jam detector 154 determines whether a predetermined time (for example, 1 second) has elapsed from the start of counting time (step S405). If a predetermined time has not elapsed, the position jam detector 154 returns to the processing of step S403 and again determines whether the third paper detector 118 has detected the front end of the paper. On the other hand, when a predetermined time has elapsed, the position jam detector 154 determines that position jam has occurred (step S406) and ends the series of steps. Note that, when position jam detection processing is not required in the paper conveying apparatus 100, this may be omitted.

Note that, when the central processing unit 150 detects that the front end of a paper is downstream of the first conveyor roller 116 and the first driven roller 117 by the third paper detection signal from the third paper detector 118, it controls the drive unit 145 to stop the rotation of the paper feed roller 111 and retard roller 112 so that the next paper is not fed. After that, when the central processing unit 150 detects the rear end of the paper downstream of the paper feed roller 111 and the retard roller 112 by the second paper detection signal from the second paper detector 114, it again controls the drive unit 145 to rotate the paper feed roller 111 and retard roller 112 and convey the next paper. Due to this, the central processing unit 150 prevents a plurality of papers from being superposed in the conveyance path. For this reason, the position jam detector 154 may start counting the time at the point of time when the central processing unit 150 controls the drive unit 145 to rotate the paper feed roller 111 and the retard roller 112 and determine that a position jam has occurred when the third paper detector 118 does not detect the front end of a paper within a predetermined time.

Figure 19:
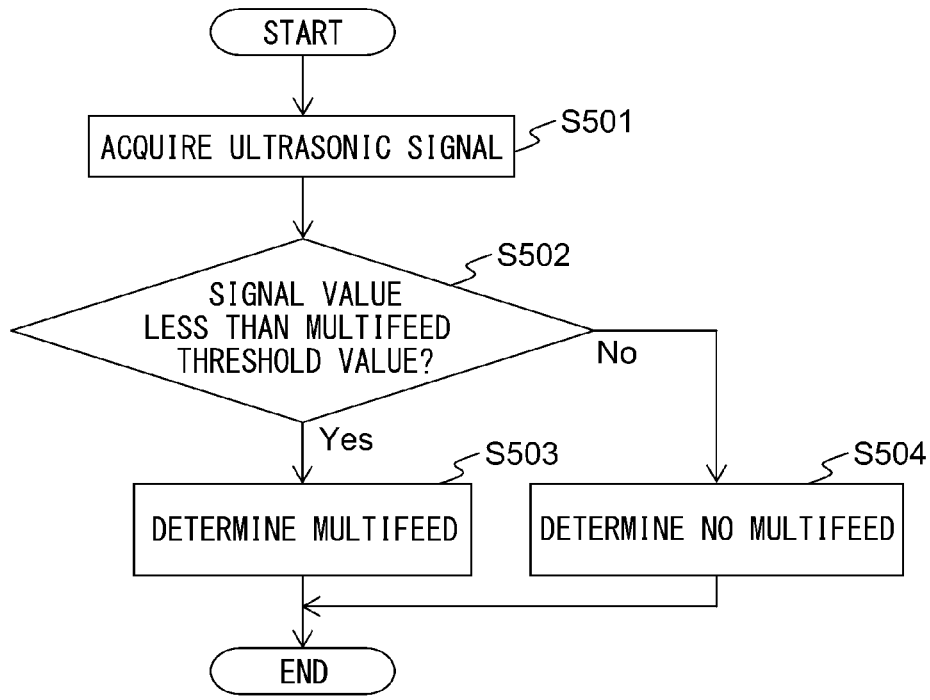
FIG. 19 is a flow chart which shows an example of operation of multifeed detection processing.

FIG. 19 is a flow chart which shows an example of operation of multifeed detection processing.

The flow of operation which is shown in FIG. 19 is executed at step S203 of the flow chart which is shown in FIG. 9.

First, the multifeed detector 155 acquires an ultrasonic signal from the ultrasonic sensor 115 (step S501).

Next, the multifeed detector 155 determines whether the signal value of the acquired ultrasonic signal is less than the multifeed detection threshold value (step S502).

Figure 20:
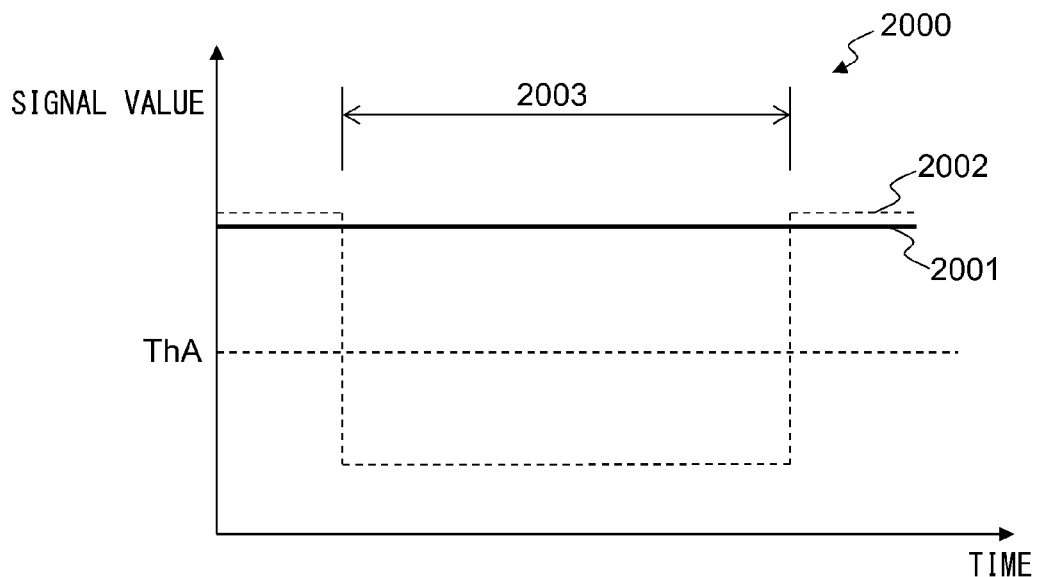
FIG. 20 is a view for explaining properties of an ultrasonic signal.

FIG. 20 is a view for explaining properties of an ultrasonic signal.

In the graph 2000 of FIG. 20, the solid line 2001 shows the characteristic of the ultrasonic signal in the case where a single paper is conveyed, while the broken line 2002 shows the characteristic of the ultrasonic signal in the case where multifeed of papers has occurred. The abscissa of the graph 2000 shows the time, while the ordinate shows the signal value of the ultrasonic signal. Due to the occurrence of multifeed, the signal value of the ultrasonic signal of the broken line 2002 falls in the section 2003. For this reason, it is possible to determine whether multifeed of papers has occurred by whether the signal value of the ultrasonic signal is less than the multifeed detection threshold value ThA.

The multifeed detector 155 determines that multifeed of the papers has occurred when the signal value of the ultrasonic signal is less than the multifeed detection threshold value (step S503), determines that multifeed of the papers has not occurred when the signal value of the ultrasonic signal is the multifeed detection threshold value or more (step S504), and ends the series of steps. Note that, when multifeed detection processing is not necessary in the paper conveying apparatus, this may be omitted.

As explained above in detail, the image reading apparatus 100 is provided with microphones 113 between the paper feed rollers 111 and retard rollers 112 and the first conveyor rollers 116 and first driven rollers 117 in the paper conveyance direction and near the side walls 130a, 130b in the direction which perpendicularly intersects the paper conveyance direction. Therefore, the image reading apparatus 100 can effectively detect sound which is generated when a skew jam has occurred and when a staple jam has occurred.

Furthermore, in the image reading apparatus 100, the microphones 113 are arranged at positions separated from the paper feed rollers 111 and retard rollers 112 in a direction which perpendicularly intersects the paper conveyance direction, so it is possible to suppress detection of a sound which is generated due to a wrinkle. Therefore, the image reading apparatus 100 can eliminate the effects of the sound which is generated due to a wrinkle and can precisely determine the occurrence of a jam by sound.

Furthermore, in the image reading apparatus 100, the microphones 113 are arranged between the paper feed rollers 111 and retard rollers 112 and the first conveyor rollers 116 and first driven rollers 117 in the paper conveyance direction, so it becomes possible to suppress detection of sound which is generated outside of the housing. Therefore, the image reading apparatus 100 can eliminate the effects of the sound which is generated outside of the housing and can precisely determine the occurrence of a jam by sound.

Furthermore, the image reading apparatus 100 can effectively detect sound which has been generated when a jam has occurred, so it becomes possible to immediately stop the conveyance of a paper when a jam occurs and possible to prevent tearing of the paper.

According to the image reading apparatus, a sound signal generator is provided between the separator and conveying module near the side wall at the conveyance path, so it becomes possible to effectively detect sound which is generated when a jam has occurred due to a paper being conveyed skewed and when a jam has occurred due to a paper being fastened by a staple.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
   a separator;
   an image reader for reading an image from a paper;
   a conveying module for conveying a paper separated by the separator to the image reader;
   a side wall provided at a side of a conveyance path of the paper conveyed from the separator to the image reader;
   a sound detector positioned entirely between the separator and the conveying module in a paper conveyance direction and within the side wall on the conveyance path side in a direction perpendicular to the paper conveyance direction and towards the conveying module;
   a sound signal generator for generating a sound signal, which is an electrical signal converted from a sound detected by the sound detector; and
   a control module for evaluating whether the sound signal generated by the sound signal generator is based on the sound generated by the paper striking to the side wall or generated by the paper twisting between the separator and the conveying module, and for determining whether a jam has occurred.

2. The image reading apparatus according to claim 1, wherein the sound detector is further positioned within a range of distance, in which the paper is placed on a paper tray and in a direction which perpendicularly intersects a paper conveyance direction.

3. The image reading apparatus according to claim 1, further comprising a second sound detector positioned between the separator and a second side wall opposite to said side wall, wherein the sound signal is an electrical signal converted from a sound detected by the sound detector and by the second sound detector.

* * * * *